US011739995B2

(12) United States Patent
Yamada et al.

(10) Patent No.: US 11,739,995 B2
(45) Date of Patent: Aug. 29, 2023

(54) REFRIGERATION CYCLE DEVICE

(71) Applicant: DAIKIN INDUSTRIES, LTD., Osaka (JP)

(72) Inventors: Takuro Yamada, Osaka (JP); Atsushi Yoshimi, Osaka (JP); Eiji Kumakura, Osaka (JP); Ikuhiro Iwata, Osaka (JP); Takeru Miyazaki, Osaka (JP); Hiromune Matsuoka, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 17/708,719

(22) Filed: Mar. 30, 2022

(65) Prior Publication Data

US 2022/0221205 A1 Jul. 14, 2022

Related U.S. Application Data

(63) Continuation of application No. PCT/JP2020/030592, filed on Aug. 11, 2020.

(30) Foreign Application Priority Data

Sep. 30, 2019 (JP) .................................. 2019-180597
Mar. 31, 2020 (JP) .................................. 2020-063397

(51) Int. Cl.
*F25B 41/40* (2021.01)
*F24F 1/32* (2011.01)
(Continued)

(52) U.S. Cl.
CPC .............. *F25B 41/40* (2021.01); *F16L 59/14* (2013.01); *F24F 1/32* (2013.01); *F24F 1/34* (2013.01)

(58) Field of Classification Search
CPC .......... F25B 41/42; F25B 41/31; F25B 41/26; F25B 1/08; F25B 1/00; F25B 41/00;
(Continued)

(56) References Cited

U.S. PATENT DOCUMENTS

2004/0134214 A1 7/2004 Song et al.
2013/0186126 A1 7/2013 Morimoto et al.
(Continued)

FOREIGN PATENT DOCUMENTS

CN 1517611 A 8/2004
EP 3101369 A1 12/2016
(Continued)

OTHER PUBLICATIONS

International Preliminary Report on Patentability issued in corresponding International Application No. PCT/JP2020/030592 dated Apr. 5, 2022 (9 pages).
(Continued)

*Primary Examiner* — Ana M Vazquez
(74) *Attorney, Agent, or Firm* — Osha Bergman Watanabe & Burton LLP

(57) ABSTRACT

A refrigeration cycle device includes a heat source, a first use unit, a second use unit, a first connection flow path, and a second connection flow path. The heat source has a compressor and a heat-source side heat exchanger. The first use unit is separated from the heat source unit and has a first use-side heat exchanger. The second use unit is separated from the heat source unit and has a second use-side heat exchanger. The first connection flow path connects the heat source unit to the first and the second use units and causes a first refrigerant to flow. The second connection flow path connects the heat source unit to the first and the second use units and causes a second refrigerant to flow. A specific
(Continued)

enthalpy of the second refrigerant is smaller than a specific enthalpy of the first refrigerant.

15 Claims, 18 Drawing Sheets

(51) Int. Cl.
  *F16L 59/14* (2006.01)
  *F24F 1/34* (2011.01)
(58) Field of Classification Search
  CPC ....... F25B 41/40; F24F 1/0068; F24F 1/0063; F24F 13/30; F24F 1/34; F24F 1/32; F16L 59/025; F16L 59/14
  See application file for complete search history.

(56) References Cited

U.S. PATENT DOCUMENTS

| | | | |
|---|---|---|---|
| 2015/0152986 A1* | 6/2015 | Taylor | F16L 37/091 285/332.2 |
| 2015/0233622 A1* | 8/2015 | Yajima | F25B 49/005 62/129 |
| 2017/0121581 A1 | 5/2017 | Horiike et al. | |

FOREIGN PATENT DOCUMENTS

| | | |
|---|---|---|
| EP | 3933300 A1 | 1/2022 |
| JP | S58-177765 U | 11/1983 |
| JP | S60-73038 U | 5/1985 |
| JP | H09-137956 A | 5/1997 |
| JP | 2706195 B2 | 1/1998 |
| JP | H11-063379 A | 3/1999 |
| JP | H11-141921 A | 5/1999 |
| JP | 2002107011 A | 4/2002 |
| JP | 2008164254 A | 7/2008 |
| JP | 2009299910 A | 12/2009 |
| JP | 2010002092 A | 1/2010 |
| JP | 5996238 B2 | 9/2016 |
| JP | 3211182 U | 6/2017 |
| JP | 6560645 B2 | 8/2019 |
| JP | 6576603 B1 | 9/2019 |
| WO | 2012066608 A1 | 5/2012 |
| WO | 2015140827 A1 | 9/2015 |

OTHER PUBLICATIONS

International Search Report issued in corresponding International Application No. PCT/JP2020/030592, dated Oct. 6, 2020 (7 pages).
Decision to Grant issued in Japanese Patent Application No. 2020-135737, dated Feb. 24, 2021 (5 pages).
Decision of Refusal issued in Japanese Patent Application No. 2020-135737, dated Oct. 13, 2020 (15 pages).
Extended European Search Report issued in corresponding European Application No. 20873274.3 dated Feb. 24, 2023 (9 pages).

* cited by examiner

REFRIGERATION CYCLE DEVICE

TECHNICAL FIELD

The present disclosure relates to a refrigeration cycle device that performs a vapor compression refrigeration cycle by using a refrigerant.

BACKGROUND

Hitherto, as described in, for example, PTL 1 (Japanese Unexamined Patent Application Publication No. 2002-107011), a refrigeration cycle device that performs a vapor compression refrigeration cycle by using a refrigerant has been known. Usually, many such refrigeration cycle devices include a heat source unit that is a heat source (for example, heat source machine A in PTL 1), and a use unit that uses heat energy that is supplied from the heat source unit (for example, indoor units B1 to Bi in PTL 1). The heat source unit and the use unit are separated from each other. In order to circulate a refrigerant between the heat source unit and the use unit, the heat source unit and the use unit are connected by a long metal connection pipe (for example, first connection pipe C and second connection pipe D in PTL 1).

SUMMARY

A refrigeration cycle device, according to one or more embodiments, includes a heat source unit that has a compressor and a heat-source-side heat exchanger; one first use unit that is installed by being separated from the heat source unit and that has a first use-side heat exchanger; a first connection flow path that connects the heat source unit and the first use unit and causes a refrigerant to flow; and a second connection flow path that connects the heat source unit and the first use unit and causes a refrigerant whose specific enthalpy is smaller than a specific enthalpy of the refrigerant that flows in the first connection flow path to flow. The heat source unit, the first use unit, the first connection flow path, and the second connection flow path constitute a refrigerant circuit that includes the compressor, the heat-source-side heat exchanger, and the first use-side heat exchanger and that repeats a vapor compression refrigeration cycle. The refrigerant circuit uses a refrigerant whose saturation pressure is 4.5 MPa or higher when a saturation temperature reaches 65° C., or a refrigerant whose critical temperature is 65° C. or lower. The first connection flow path includes a metallic first connection pipe and a metallic second connection pipe, and is formed so that a refrigerant flows from one of the heat source unit and the first use unit to both of the first connection pipe and the second connection pipe, and so that both refrigerants that each flow in a corresponding one of the first connection pipe and the second connection pipe each flow from the corresponding one of the first connection pipe and the second connection pipe to the other of the heat source unit and the first use unit.

DETAILED DESCRIPTION

First Embodiment (1) General Description

Figure 1:
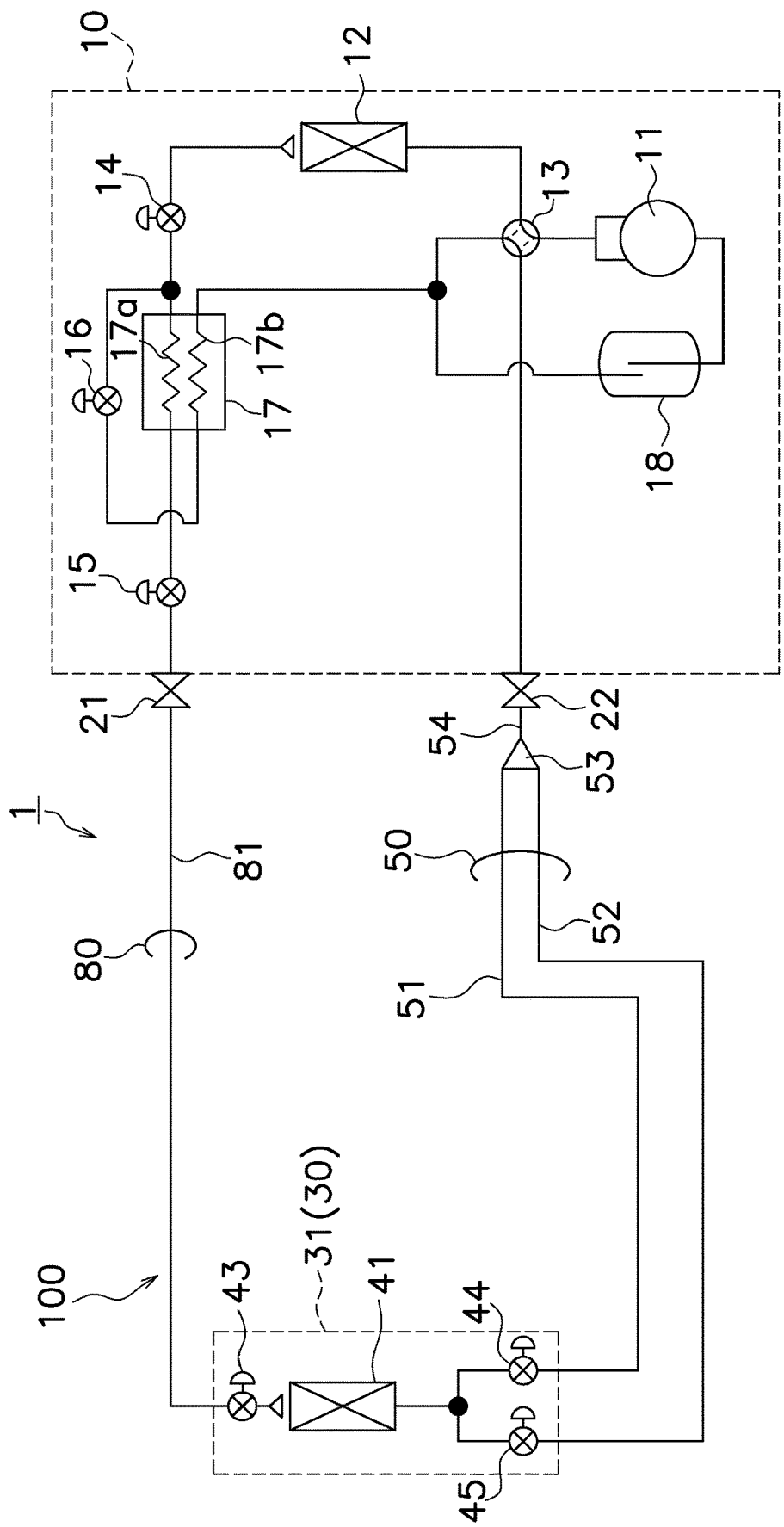
FIG. 1 is a circuit diagram showing an example of a structure of an air conditioner according to a first embodiment.

FIG. 1 shows an air conditioner 1 as an example of a refrigeration cycle device. The refrigeration cycle device here is a device that circulates a refrigerant and repeats a vapor compression refrigeration cycle. Although, in the embodiments below, the air conditioner 1, which is a refrigeration cycle device, is described, the refrigeration cycle device is not limited to the air conditioner 1. The refrigeration cycle device is applicable to, for example, a heat-pump water heater, a refrigerator, and a cooling apparatus that cools an interior.

The air conditioner 1 shown in FIG. 1 includes a heat source unit 10 and a use unit 30. The use unit 30 includes one first use unit 31. The first use unit 31 is installed by being separated from the heat source unit 10. The heat source unit 10 has a compressor 11 and a heat-source-side heat exchanger 12. The first use unit 31 has a first use-side heat exchanger 41.

The air conditioner 1 includes a first connection flow path 50 and a second connection flow path 80. In a state in which the air conditioner 1 repeats the vapor compression refrigeration cycle, the specific enthalpy of a refrigerant that flows in the second connection flow path 80 is smaller than the specific enthalpy of a refrigerant that flows in the first connection flow path 50. The first connection flow path 50 includes a metallic first connection pipe 51 and a metallic second connection pipe 52. A refrigerant that flows in the air conditioner 1 passes through the first connection flow path 50 and the second connection flow path 80 to circulate between the heat source unit 10 and the first use unit 31. In other words, the heat source unit 10, the first use unit 31, the first connection flow path 50, and the second connection flow path 80 constitute a refrigerant circuit 100.

The refrigerant circuit 100 includes the compressor 11, the heat-source-side heat exchanger 12, and the first use-side heat exchanger 41. At the refrigerant circuit 100, the vapor compression refrigeration cycle is repeated. At the refrigerant circuit 100, a refrigerant whose saturation pressure is 4.5 MPa or higher when the saturation temperature reaches 65° C., or a refrigerant whose critical temperature is 65° C. or lower is used. Examples of refrigerants whose saturation pressure is 4.5 MPa or higher when the saturation temperature reaches 65° C. are, for example, carbon dioxide based mixed refrigerants (such as carbon dioxide+R32 and carbon dioxide+R1234ze). Examples of refrigerants whose critical temperature is 65° C. or lower are carbon dioxide, R23, and R1123.

The air conditioner 1 has a structure capable of switching between a heating operation and a cooling operation. In the heating operation, a refrigerant flows to both of the first connection pipe 51 and the second connection pipe 52 from the heat source unit 10. In the heating operation, the refrigerant that flows in both of the first connection pipe 51 and the second connection pipe 52 further flows to the one first use unit 31 from the first connection pipe 51 and the second connection pipe 52.

In the cooling operation, a refrigerant flows to both of the first connection pipe 51 and the second connection pipe 52 from the one first use unit 31. In the cooling operation, both refrigerants that each flow in a corresponding one of the first connection pipe 51 and the second connection pipe 52 each further flow to the heat source unit 10 from the corresponding one of the first connection pipe 51 and the second connection pipe 52.

In the air conditioner 1, a refrigerant that flows between the heat source unit 10 and the one first use unit 31 can be divided by the first connection pipe 51 and the second connection pipe 52. Therefore, compared with when a refrigerant that flows between the heat source unit 10 and the first use unit 31 flows in one connection pipe, it is possible to reduce the pipe diameters of the first connection pipe 51 and the second connection pipe 52.

The heat source unit 10 and the first use unit 31 are each separated and transported to a construction site. The heat source unit 10 is installed, for example, on a roof of a building or an outer periphery of a house. The first use unit 31 is installed, for example, in a room inside a building or inside a house. The first connection pipe 51 and the second connection pipe 52 are bent along, for example, a wall, a floor, or a ceiling, and is disposed at a building or a house, and are connected to the heat source unit 10 and the first use unit 31. Compared with when construction is performed with one connection pipe, it is easier to process the thin first connection pipe 51 and the thin second connection pipe 52 at a site. For example, when one thick connection pipe is used and is to be bent to install the connection pipe, it is difficult to bend the thick connection pipe, and, for example, a bent elbow needs to be brazed, as a result of which construction time is increased and thus costs are increased. In contrast, the air conditioner 1 including the thin first connection pipe 51 and the thin second connection pipe 52 is such that the pipes can sometimes be installed by a bending operation at a construction site, and can reduce construction time and improve work efficiency at the time of construction related to the first connection pipe 51 and the second connection pipe 52.

(2) Detailed Structure (2-1) First Connection Flow Path 50 and Second Connection Flow Path 80

The first connection flow path 50 shown in FIG. 1 includes, in addition to the metallic first connection pipe 51 and the metallic second connection pipe 52, a first branch pipe 53 and a single pipe 54. The first connection pipe 51 and the second connection pipe 52 are main pipe parts, and the first branch pipe 53 and the single pipe 54 are pipes other than the main pipes. In other words, the first branch pipe 53 and the single pipe 54 are connection pipes for connecting the first connection pipe 51 and the second connection pipe 52, which are main pipe parts, to the heat source unit 10. Therefore, the first branch pipe 53 is disposed near the heat source unit 10. The single pipe 54 is shorter than the first connection pipe 51 and the second connection pipe 52. The length of the single pipe 54 is, for example, 1 m or less.

One end of the single pipe 54 is connected to a shutoff valve 22 of the heat source unit 10. The other end of the single pipe 54 is connected to a first in and out port of the first branch pipe 53. A second in and out port of the first branch pipe 53 is connected to one end of the first connection pipe 51, and a third in and out port thereof is connected to the second connection pipe 52. The other end of the first connection pipe 51 and the other end of the second connection pipe 52 are connected to the first use unit 31. A flow path cross-sectional area of a collecting pipe formed from the first connection pipe 51 and the second connection pipe 52 is greater than or equal to 90% of a flow path cross-sectional area of the single pipe 54. In order to obtain a suitable pressure loss at the first connection pipe 51 and the second connection pipe 52, a flow path cross-sectional area that is the total of the flow path cross-sectional area of the first connection pipe 51 and the flow path cross-sectional area of the second connection pipe 52 may be larger than the flow path cross-sectional area of the single pipe 54.

When the air conditioner 1 is performing a heating operation, a refrigerant flows toward the single pipe 54 from the shutoff valve 22. In this case, a refrigerant that has flowed into the first branch pipe 53 from the single pipe 54 is divided at the first branch pipe 53 by the first connection pipe 51 and the second connection pipe 52. When the air conditioner 1 is performing a cooling operation, a refrigerant flows toward the shutoff valve 22 from the single pipe 54.

The first connection pipe 51 and the second connection pipe 52 may each have an outside diameter of 12.7 mm or less. The pipe type may be a soft pipe (O material of a copper pipe) that is easily bent. When the refrigerant is carbon dioxide, a ½H material of a copper pipe may have a thickness that is greater than or equal to 12% of the outside diameter thereof, an O material of a copper pipe may have a thickness that is greater than or equal to 20% of the outside diameter thereof, and stainless steel may have a thickness that is greater than or equal to 7.5% of the outside diameter thereof. The definitions of temper designations "½H" and "0" comply with JIS-H3300. When carbon dioxide is a refrigerant, that is, a refrigerant whose state becomes a supercritical state, the pressure inside the pipes tends to increase compared with that when a refrigerant that is not used in a supercritical state is used. However, as long as the pipes have the aforementioned thicknesses, even if the pipes are used with a refrigerant in a supercritical state, the pipes can be provided with sufficient pressure resistance. In this way, when carbon dioxide is a refrigerant, the thicknesses of the first connection pipe 51 and the second connection pipe 52 tend to increase. However, by keeping down the outside diameters to 12.7 mm or less, the first connection pipe 51 and the second connection pipe 52 can be bent by a bender. For example, when the outside diameters of the connection pipes become 15 mm or greater, it becomes difficult to perform a bending operation at a site, and it becomes necessary to, for example, use a special-purpose socket that is bent in an L shape.

The second connection flow path 80 shown in FIG. 1 includes one metallic pipe 81. One end of the metallic pipe 81 is connected to the shutoff valve 21, and the other end thereof is connected to one end of an indoor expansion valve 43. Since the specific enthalpy of a refrigerant that flows in the second connection flow path 80 is smaller than the specific enthalpy of a refrigerant that flows in the first connection flow path 50, the flow rate of the refrigerant that flows in the second connection flow path 80 is smaller than the flow rate of the refrigerant that flows in the first connection flow path 50. Compared with the total of the flow path cross-sectional area of the first connection pipe 51 and the flow path cross-sectional area of the second connection pipe 52 in the first connection flow path 50, the cross-sectional area of the second connection flow path 80 may be smaller, and even one metallic pipe 81 can be made thin. Therefore, the outside diameter of both or one of the first connection pipe 51 and the second connection pipe 52 may be substantially the same as the outside diameter of the metallic pipe 81. Here, "substantially the same" means that, for example, the outside diameter difference is within plus or minus 10%. In order to prevent a mix-up of pipes, the covering color of the metallic pipe 81 may differ from that of the connection pipe, among the first connection pipe 51 and the second connection pipe 52, whose outside diameter is substantially the same as that of the metallic pipe 81. For example, the covering color of the first connection flow path 50 is a warm-color-based color, and the covering color of the second connection flow path 80 is a cold-color-based color. The material of the metallic pipe 81 is, for example, copper or stainless steel. The overall length of the metallic pipe 81 is substantially the same as the overall length of the first connection pipe 51 and the overall length of the second connection pipe 52.

(2-2) Heat Source Unit 10

The heat source unit 10 shown in FIG. 1 includes, in addition to the compressor 11 and the heat-source-side heat exchanger 12 above, a four-way valve 13, a first expansion valve 14, a second expansion valve 15, a third expansion valve 16, a subcooling heat exchanger 17, a receiver 18, and the shutoff valves 21 and 22.

A discharge port of the compressor 11 and a first port of the four-way valve 13 are connected to each other. One inlet/outlet of the heat-source-side heat exchanger 12 is connected to a second port of the four-way valve 13. One end of the first expansion valve 14 is connected to the other inlet/outlet of the heat-source-side heat exchanger 12, and one inlet/outlet of a main flow path 17a of the subcooling heat exchanger 17 is connected to the other end of the first expansion valve 14. One end of the second expansion valve 15 is connected to the other inlet/outlet of the main flow path 17a of the subcooling heat exchanger 17, and the shutoff valve 21 is connected to the other end of the second expansion valve 15. One end of the third expansion valve 16 is connected to a flow path that connects the other end of the first expansion valve 14 and the one inlet/outlet of the main flow path 17a of the subcooling heat exchanger 17. The other end of the third expansion valve 16 is connected to one inlet/outlet of a cooling flow path 17b of the subcooling heat exchanger 17. The other inlet/outlet of the cooling flow path 17b is connected to a flow path that connects a third port of the four-way valve 13 and an inlet of the receiver 18. An outlet of the receiver 18 is connected to a suction port of the compressor 11. A fourth port of the four-way valve 13 is connected to the shutoff valve 22.

The compressor 11 is capable of compressing a refrigerant sucked in from the suction port and discharging a refrigerant in a supercritical state from the discharge port. The four-way valve 13 is capable of switching between a state in which the first port and the second port communicate with each other and the third port and the fourth port communicate with each other (state show by solid lines) and a state in which the first port and the fourth port communicate with each other and the second port and the third port communicate with each other (state shown by broken lines). The heat-source-side heat exchanger 12, for example, causes heat to be exchanged between outdoor air and a refrigerant. The first expansion valve 14, the second expansion valve 15, and the third expansion valve 16 are constituted so that their opening degrees are changeable. The first expansion valve 14, the second expansion valve 15, and the third expansion valve 16 make it possible to adjust the degree of decompression/expansion as a result of changing the opening degrees. The first expansion valve 14, the second expansion valve 15, and the third expansion valve 16, for example, in a fully open state, do not perform a decompression/expansion operation and simply pass a refrigerant therethrough. The subcooling heat exchanger 17 causes heat to be exchanged between a refrigerant that flows in the main flow path 17a and a refrigerant that flows in the cooling flow path 17b. The receiver 18 can accumulate a refrigerant.

(2-3) First Use Unit 31

The first use unit 31 shown in FIG. 1 includes, in addition to the first use-side heat exchanger 41 above, the indoor expansion valve 43, a first on-off valve 44, and a second on-off valve 45. The one end of the indoor expansion valve 43 is connected to the other end of the metallic pipe 81, and the other end of the indoor expansion valve 43 is connected one inlet/outlet of the first use-side heat exchanger 41. One end of the first of-off valve 44 and one end of the second on-off valve 45 are connected to the other inlet/outlet of the first use-side heat exchanger 41. The first use-side heat exchanger 41, for example, causes heat to be exchanged between indoor air and a refrigerant. The indoor expansion valve 43 is constituted so that its opening degree is changeable. The indoor expansion valve 43 makes it possible to adjust the degree of decompression/expansion as a result of changing the opening degree, and, for example, in a fully open state, does not perform a decompression/expansion operation and simply passes a refrigerant therethrough. The first on-off valve 44 and the second on-off valve 45 are capable of opening and closing a flow path.

(3) Overall Operation

The air conditioner 1 shown in FIG. 1 is constituted to switch between a cooling operation and a heating operation by switching a flow path by the four-way valve 13. At the time of the cooling operation, the first port and the second port of the four-way valve communicate with each other and the third port and the fourth port of the four-way valve 13 communicate with each other. In both the cooling operation and the heating operation, the shutoff valves 21 and 22 are open.

(3-1) Heating Operation

In a normal heating operation mode, the first on-off valve 44 and the second on-off valve 45 are in an open state. When a refrigerant is carbon dioxide, at the time of the heating operation, the compressor 11 compresses the refrigerant to a supercritical state and discharges the refrigerant. The high-temperature, high-pressure refrigerant in the supercritical state discharged from the compressor 11 passes through the first port and the fourth port of the four-way valve 13, passes through the shutoff valve 22, and flows into the first connection flow path 50. At the first connection flow path 50, the refrigerant in the supercritical state flows into the first branch pipe 53 from the single pipe 54. At the branch pipe 53, the refrigerant is split into a refrigerant that flows in the first connection pipe 51 and a refrigerant that flows in the second connection pipe 52. The refrigerants that each flow in a corresponding one of both of the first connection pipe 51 and the second connection pipe 52 flow into the first use-side heat exchanger 41 via a corresponding one of the first on-off valve 44 and the second on-off valve 45. The refrigerant that has entered the first use-side heat exchanger 41 exchanges heat with indoor air at the first use-side heat exchanger 41 to apply heat to the indoor air. At this time, the first use-side heat exchanger 41 functions as a heat dissipater. The heated indoor air heats the interior of a room. The refrigerant in the supercritical state that has exited from the first use-side heat exchanger 41 is decompressed and expanded at the indoor expansion valve 43, and flows into the heat source unit 10 via the second connection flow path 80 and the shutoff valve 21.

The second expansion valve of the heat source unit 10 is in a fully open state. The refrigerant that has passed through the second expansion valve 15 flows into the main flow path 17a of the subcooling heat exchanger 17. The refrigerant that has flowed into the main flow path 17a of the subcooling heat exchanger 17 is divided into a refrigerant that flows into the first expansion valve 14 from the main flow path 17a and a refrigerant that flows into the cooling flow path 17b via the third expansion valve 16. The refrigerant that flows in the cooling flow path 17b, by being decompressed and expanded at the third expansion valve 16, has a low temperature, and takes away heat from the refrigerant that flows in the main flow path 17a. The refrigerant that has taken away heat at the cooling flow path 17b flows into the receiver 18. The refrigerant that has flowed into the first expansion valve 14 from the main flow path 17a is decompressed and expanded and becomes a low-temperature, low-pressure refrigerant at the first expansion valve 14. The low-temperature, low-pressure refrigerant exchanges heat with outdoor air or the like and obtains heat from the outdoor air at the first use-side heat exchanger 41. The refrigerant that has obtained heat and that has been converted into a gas flows into the receiver 18. The gaseous refrigerant in a refrigerant that is stored in the receiver 18 is sucked in from the suction port of the compressor 11.

(3-2) Cooling Operation

In a normal cooling operation mode, the first on-off valve 44 and the second on-off valve 45 are in an open state. When a refrigerant is carbon dioxide, at the time of the cooling operation, the compressor 11 compresses the refrigerant to a supercritical state and discharges the refrigerant. The refrigerant in the supercritical state discharged from the compressor 11 dissipates heat at the heat-source-side heat exchanger 12. The first expansion valve 14 is in a fully open state. The refrigerant that has passed through the first expansion valve 14 is divided into a refrigerant that flows into the main flow path 17a of the subcooling heat exchanger 17 and a refrigerant that flows into the cooling flow path 17b via the third expansion valve 16. Since the refrigerant that flows in the cooling flow path 17b, by being decompressed and expanded at the third expansion valve 16, has a low temperature, heat is taken away from the refrigerant that flows in the main flow path 17a. The refrigerant that has passed through the main flow path 17a of the subcooling heat exchanger 17 is decompressed and expanded and becomes a liquid refrigerant in a subcooled state at the second expansion valve 15.

The refrigerant in the subcooled state that has flowed into the indoor expansion valve 43 via the second connection flow path 80 and the shutoff valve 21 from the second expansion valve 15 is decompressed and expanded and becomes a low-temperature, low-pressure refrigerant at the indoor expansion valve 43. The low-temperature, low-pressure refrigerant flows into the first use-side heat exchanger 41 from the indoor expansion valve 43. At the first use-side heat exchanger 41, the refrigerant exchanges heat with indoor air or the like and takes away heat from the indoor air. The air whose heat has been taken away cools the interior of a room. The refrigerant that has obtained heat and that has been converted into a gas flows into both of the first connection pipe 51 and the second connection pipe 52 from the first use-side heat exchanger 41. The refrigerants that have each flowed into a corresponding one of both of the first connection pipe 51 and the second connection pipe 52 merge at the first branch pipe 53, and the merged refrigerant passes through the single pipe 54 and the shutoff valve 22 and flows into the heat source unit 10. The refrigerant that has passed through the shutoff valve 22 flows into the receiver 18 via the fourth port and the third port of the four-way valve 13. The gaseous refrigerant in a refrigerant that is stored in the receiver 18 is sucked in from the suction port of the compressor 11. The refrigerant that has flowed out of the cooling flow path 17b flows into the receiver 18.

(3-3) Oil-Return Operation Mode

In an oil-return operation mode, the air conditioner 1 closes one of the first on-off valve 44 and the second on-off valve 45, and causes a refrigerant to flow in one of the first connection pipe 51 and the second connection pipe 52. For example, by closing the second on-off valve 45 and causing a refrigerant to flow in only the first connection pipe 51, the flow velocity of the flow of the refrigerant can be made higher than that when the refrigerant is caused to flow in both of the first connection pipe 51 and the second connection pipe 52. Since the flow velocity is increased, oil in the first connection pipe 51 can be returned in a short time. Even when, in order to return oil from the second connection pipe 52, an oil-return operation, in which a refrigerant is caused to flow in only the second connection pipe 52 by closing the first on-off valve 44, is performed, the same effects are realized. Since a liquid refrigerant does not flow in the first connection pipe 51 and the second connection pipe 52, the effect of quickly returning oil by increasing the flow velocity of the refrigerant is noticeable.

Second Embodiment (4) General Description

As shown in FIG. 1, the air conditioner 1 according to the first embodiment above has been described as one in which the use unit 30 includes one first use unit 31. In contrast, an air conditioner 1 shown in FIG. 2 includes a plurality of use units 30.

Figure 2:
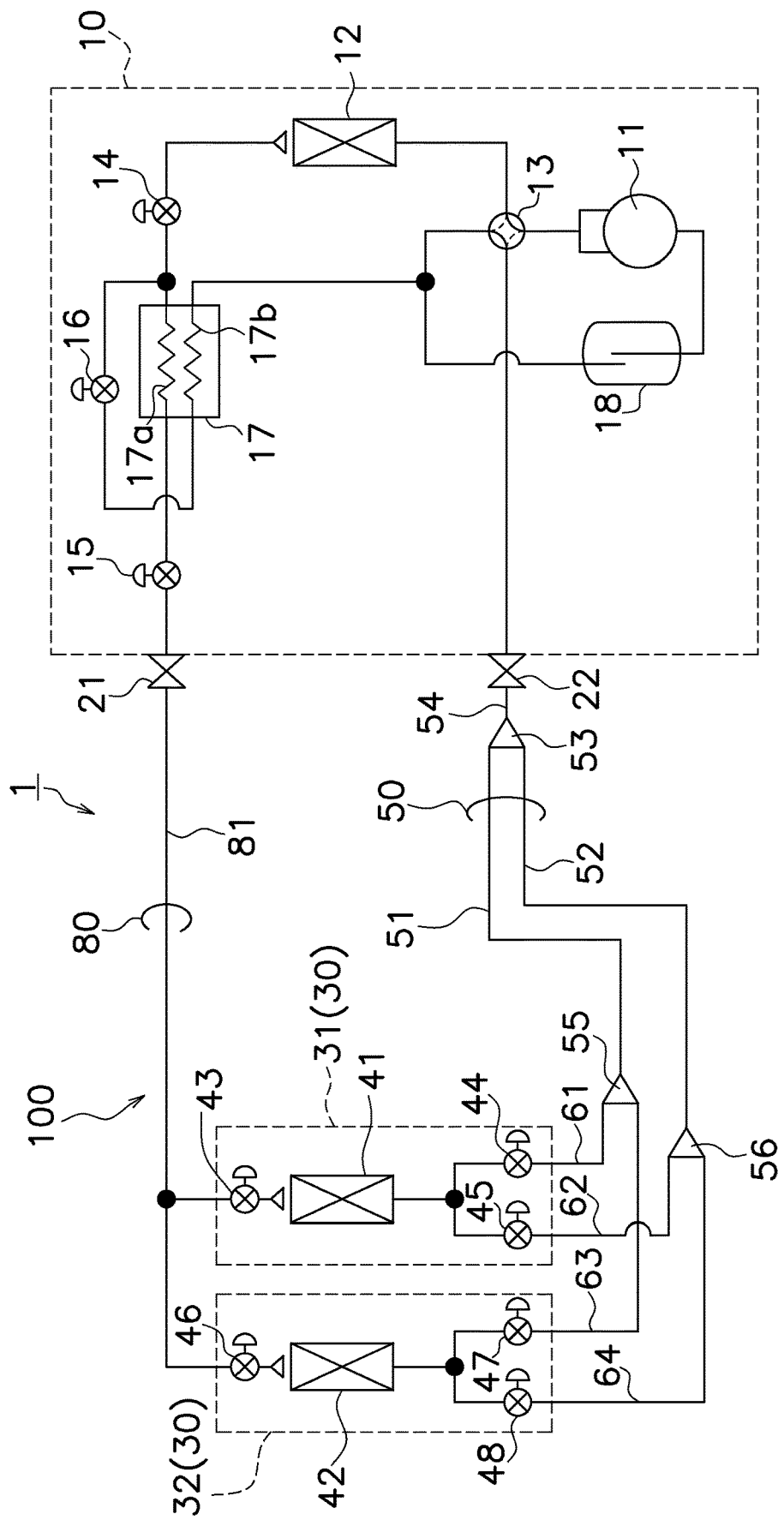
FIG. 2 is a circuit diagram showing an example of a structure of an air conditioner according to a second embodiment.

The air conditioner 1 shown in FIG. 2 includes a heat source unit 10 and the plurality of use units 30. The plurality of use units 30 include first use units 31 and second use units 32. In order to simplify the illustration, FIG. 2 shows the air conditioner 1 including two use units 30 (one first use unit 31 and one second use unit 32). However, the plurality of use units of the air conditioner 1 are not limited to two use units 30. The air conditioner 1 can be constituted to include three or more use units 30.

The first use unit 31 and the second use unit 32 are each installed by being separated from the heat source unit 10. The heat source unit 10 has a compressor 11 and a heat-source-side heat exchanger 12. The first use unit 31 has a first use-side heat exchanger 41. The second use unit 32 has a second use-side heat exchanger 42. A general description of a first connection flow path 50 and a second connection flow path 80 of the air conditioner 1 of the second embodiment is the same as that of the first embodiment and thus is not given.

The refrigerant circuit 100 includes the compressor 11, the heat-source-side heat exchanger 12, the first use-side heat exchanger 41, and the second use-side heat exchanger 42. Even in the refrigerant circuit 100 of the second embodiment, a refrigerant that is of the same type as the refrigerant that is used in the refrigerant circuit 100 of the first embodiment is used.

The air conditioner 1 has a structure capable of switching between a heating operation and a cooling operation. In the heating operation, a refrigerant flows to both of the first connection pipe 51 and the second connection pipe 52 from the heat source unit 10. In the heating operation, the refrigerant that flows in both of the first connection pipe 51 and the second connection pipe 52 further flows to the one first use unit 31 from the first connection pipe 51 and the second connection pipe 52. In addition, the refrigerant that flows in both of the first connection pipe 51 and the second connection pipe 52 flows to the one second use unit 32 from the first connection pipe 51 and the second connection pipe 52.

In the cooling operation, a refrigerant flows to both of the first connection pipe 51 and the second connection pipe 52 from the one first use unit 31. In addition, the refrigerant flows to both of the first connection pipe 51 and the second connection pipe 52 from the one second use unit 32. In the cooling operation, both refrigerants that each flow in a corresponding one of the first connection pipe 51 and the second connection pipe 52 each further flow to the heat source unit 10 from the corresponding one of the first connection pipe 51 and the second connection pipe 52.

In the air conditioner 1, a refrigerant that flows between the heat source unit 10 and each of the one first use unit 31 and the one second use unit 32 can be divided by the first connection pipe 51 and the second connection pipe 52. Therefore, compared with when a refrigerant that flows between the heat source unit 10 and each of the first use unit 31 and the second use unit 32 is caused to flow by using one connection pipe, it is possible to reduce the pipe diameters of the first connection pipe 51 and the second connection pipe 52.

(5) Detailed Structure (5-1) First Connection Flow Path 50 and Second Connection Flow Path 80

Since the second connection flow path 80 of the second embodiment shown in FIG. 2 can be constituted similarly to the second connection flow path 80 of the first embodiment shown in FIG. 1, a description thereof is not given.

The first connection flow path 50 shown in FIG. 2 includes, in addition to the metallic first connection pipe 51 and the metallic second connection pipe 52 above, a first branch pipe 53, a single pipe 54, a second branch pipe 55, a third branch pipe 56, and joints 61, 62, 63, and 64. Since the first connection pipe 51, the second connection pipe 52, the first branch pipe 53, and the single pipe 54 of the first connection flow path 50 of the second embodiment have been described in the first embodiment, they are not described here.

The other end of each of the first connection pipe 51 and the second connection pipe 52 communicates with the first use unit 31. The other end of each of the first connection pipe 51 and the second connection pipe 52 also communicates with the second use unit 32. In order to perform such a connection, the second branch pipe 55, the third branch pipe 56, and the joints 61, 62, 63, and 64 are interposed between the other end of each of the first connection pipe 51 and the second connection pipe 52 and each of the first use unit 31 and the second use unit 32. Here, although the second branch pipe 55, the third branch pipe 56, and the joints 61, 62, 63, and 64 are constituted by separate components, several of them may be formed all at once as one component. For example, the second branch pipe 55 and the third branch pipe 56 may be formed all at once as one component. The joints 61 to 64 are short metallic pipes, such as short copper pipes, and are shorter than the first connection pipe 51 and the second connection pipe 52.

The other end of the first connection pipe 51 is connected to a first in and out port of the second branch pipe 55. The other end of the second connection pipe 52 is connected to a first in and out port of the third branch pipe 56. A second in and out port of the second branch pipe 55 and the other end of the first on-off valve 44 of the first use unit 31 are connected to each other by the joint 61, and a second in and out port of the third branch pipe 56 and the other end of the second on-off valve 45 of the first use unit 31 are connected to each other by the joint 62. A third in and out port of the second branch pipe 55 and the other end of a first on-off valve 47 of the second use unit 32 are connected to each other by the joint 63, and a third in and out port of the third branch pipe 56 and the other end of a second on-off valve 48 of the second use unit 32 are connected to each other by the joint 64.

(5-2) Heat Source Unit 10

A structure of the heat source unit 10 of the second embodiment can be the same as the structure of the heat source unit 10 of the first embodiment.

(5-3) First Use Unit 31 and Second Use Unit 32

The second use unit 32 shown in FIG. 2 has the same structure as the first use unit 31. In other words, the second use unit 32 includes the second use-side heat exchanger 42, an indoor expansion valve 46, the first on-off valve 47, and the second on-off valve 48, which correspond to the first use-side heat exchanger 41, the indoor expansion valve 43, the first on-off valve 44, and the second on-off valve 45 of the first use unit 31, respectively. Therefore, here, the second use unit 32 is not described. One end of the indoor expansion valve 46 of the second use unit 32 is also connected to the other end of a metallic pipe 81 of the second connection flow path 80. Note that branch pipes and the like are also provided in the second connection flow path 80.

(6) Operation of Air Conditioner 1

Similarly to the air conditioner 1 shown in FIG. 1, the air conditioner 1 shown in FIG. 2 is also constituted to switch between a cooling operation and a heating operation by switching a flow path by a four-way valve 13. The air conditioner 1 shown in FIG. 2 is capable of performing a cooling operation and a heating operation by using not only the first use unit 31 but also the second use unit 32.

When the air conditioner 1 performs a heating operation by using the second use unit 32, for example, the air conditioner 1 performs control so that a refrigerant does not flow in the first use unit 31 by closing the first on-off valve 44 and the second on-off valve 45 of the first use unit 31. When the air conditioner 1 performs a cooling operation by using the second use unit 32, for example, the air conditioner 1 performs control so that a refrigerant does not flow in the first use unit 31 by closing the indoor expansion valve 43 of the first use unit 31.

When the air conditioner 1 performs a heating operation by using the first use unit 31, for example, the air conditioner 1 performs control so that a refrigerant does not flow in the second use unit 32 by closing the first on-off valve 47 and the second on-off valve 48 of the second use unit 32. When the air conditioner 1 performs a cooling operation by using the first use unit 31, for example, the air conditioner 1 performs control so that a refrigerant does not flow in the second use unit 32 by closing the indoor expansion valve 46 of the second use unit 32.

The operations of the air conditioner 1 when performing a cooling operation or a heating operation by using the second use unit 32 or both of the first use unit 31 and the second use unit are also the same as the operations of the air conditioner 1 when performing a cooling operation or a heating operation by using the first use unit 31. Therefore, here, descriptions thereof are not given.

In an oil-return operation mode, the air conditioner 1 closes one pair of a pair of the first on-off valves 44 and 47 and a pair of the second on-off valves 45 and 48, and causes a refrigerant to flow in one of the first connection pipe 51 and the second connection pipe 52. For example, by closing the second on-off valves 45 and 48 and causing a refrigerant to flow in only the first connection pipe 51, the flow velocity of the flow of the refrigerant can be made higher than that when the refrigerant is caused to flow in both of the first connection pipe 51 and the second connection pipe 52. Since the flow velocity is increased, oil in the first connection pipe 51 can be returned in a short time. Even when, in order to return oil from the second connection pipe 52, an oil-return operation, in which a refrigerant is caused to flow in only the second connection pipe 52 by closing the first on-off valves 44 and 47, is performed, the same effects are realized.

(7) Modifications (7-1) Modification A

In the first embodiment and the second embodiment, a case in which a refrigerant is carbon dioxide and the state of the refrigerant when discharged from the compressor is a supercritical state has been described. However, such a refrigerant is not limited to carbon dioxide. A refrigerant whose critical temperature is 65° C. or lower is used as such a refrigerant. Examples of such a refrigerant other than carbon dioxide are R23 and R1123.

(7-2) Modification B

In the first embodiment and the second embodiment, the air conditioner 1 using a refrigerant whose critical temperature is 65° C. or lower has been described. However, the refrigerant that is used in the air conditioner 1 is not limited to a refrigerant whose critical temperature is 65° C. or lower, and may be a refrigerant whose saturation pressure is 4.5 MPa or higher when the saturation temperature reaches 65° C. When such a refrigerant is used, at the time of a heating operation, the state of the refrigerant that flows in the first connection pipe 51 and the second connection pipe 52 is a gaseous state. Although the refrigerant that flows in the first connection pipe 51 and the second connection pipe 52 is not in a supercritical state as it is in the first embodiment and the second embodiment, the pressure is very high at 4.5 MPa or higher. In order to withstand such a high pressure, as with the case in which the refrigerant is carbon dioxide, if an attempt is made to install a pipe by using one connection pipe, the thickness of the pipe must be increased, as a result of which construction becomes difficult. A refrigeration cycle device using a refrigerant whose saturation pressure is 4.5 MPa or higher when the saturation temperature reaches 65° C. provides effects that are the same as those of the air conditioners 1 of the first embodiment and the second embodiment by separating the first connection pipe 51 and the second connection pipe 52 as in the first embodiment and the second embodiment.

(7-3) Modification C

In the first embodiment and the second embodiment above, in a heating operation, refrigerants that flow in the first connection pipe 51 and the second connection pipe 52 merge at each of the first use unit 31 and the second use unit 32. In a cooling operation, the refrigerant that has been split in each of the first use unit 31 and the second use unit 32 flows as refrigerants in a corresponding one of the first connection pipe 51 and the second connection pipe 52.

Figure 3:
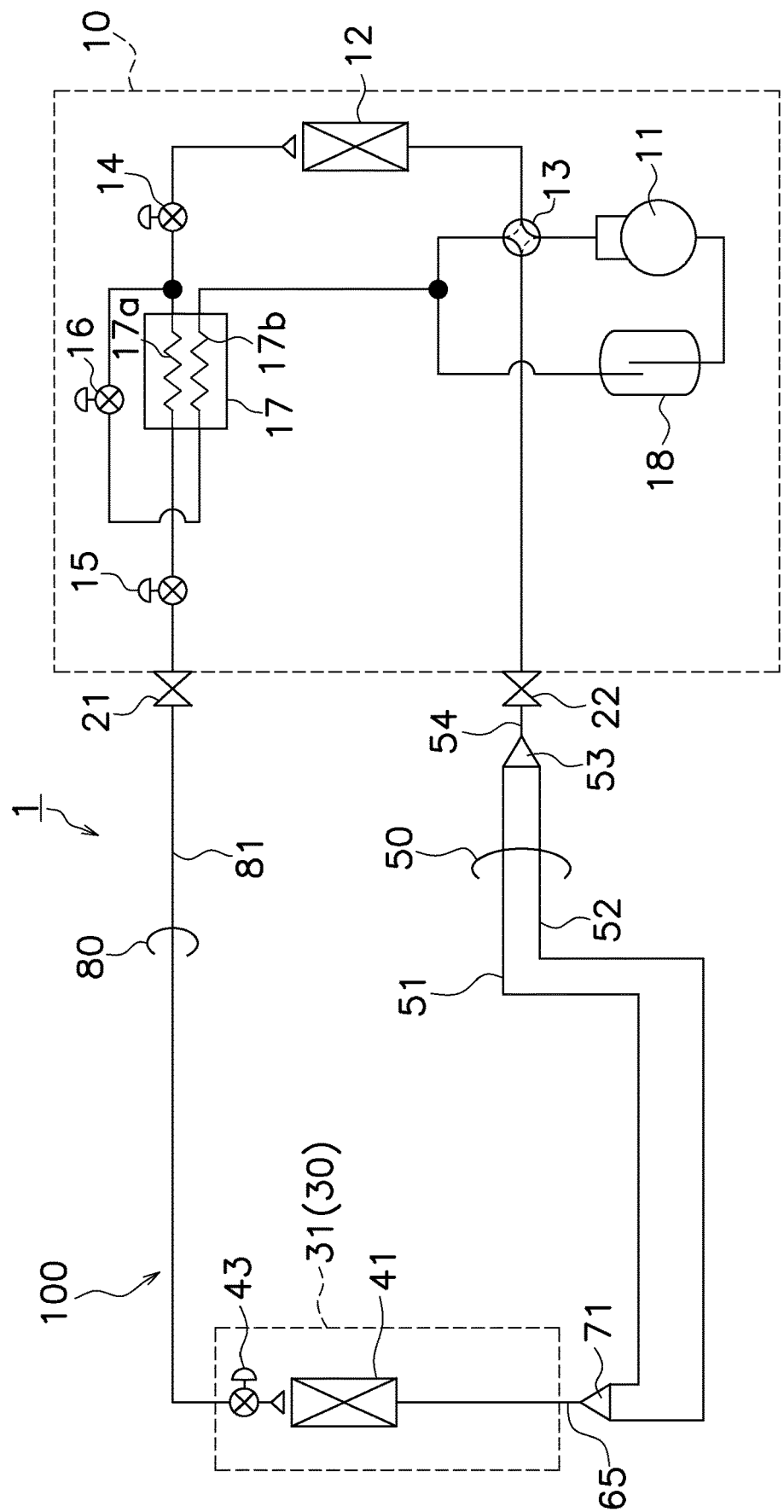
FIG. 3 is a circuit diagram showing an example of a structure of an air conditioner according to Modification C.
Figure 4:
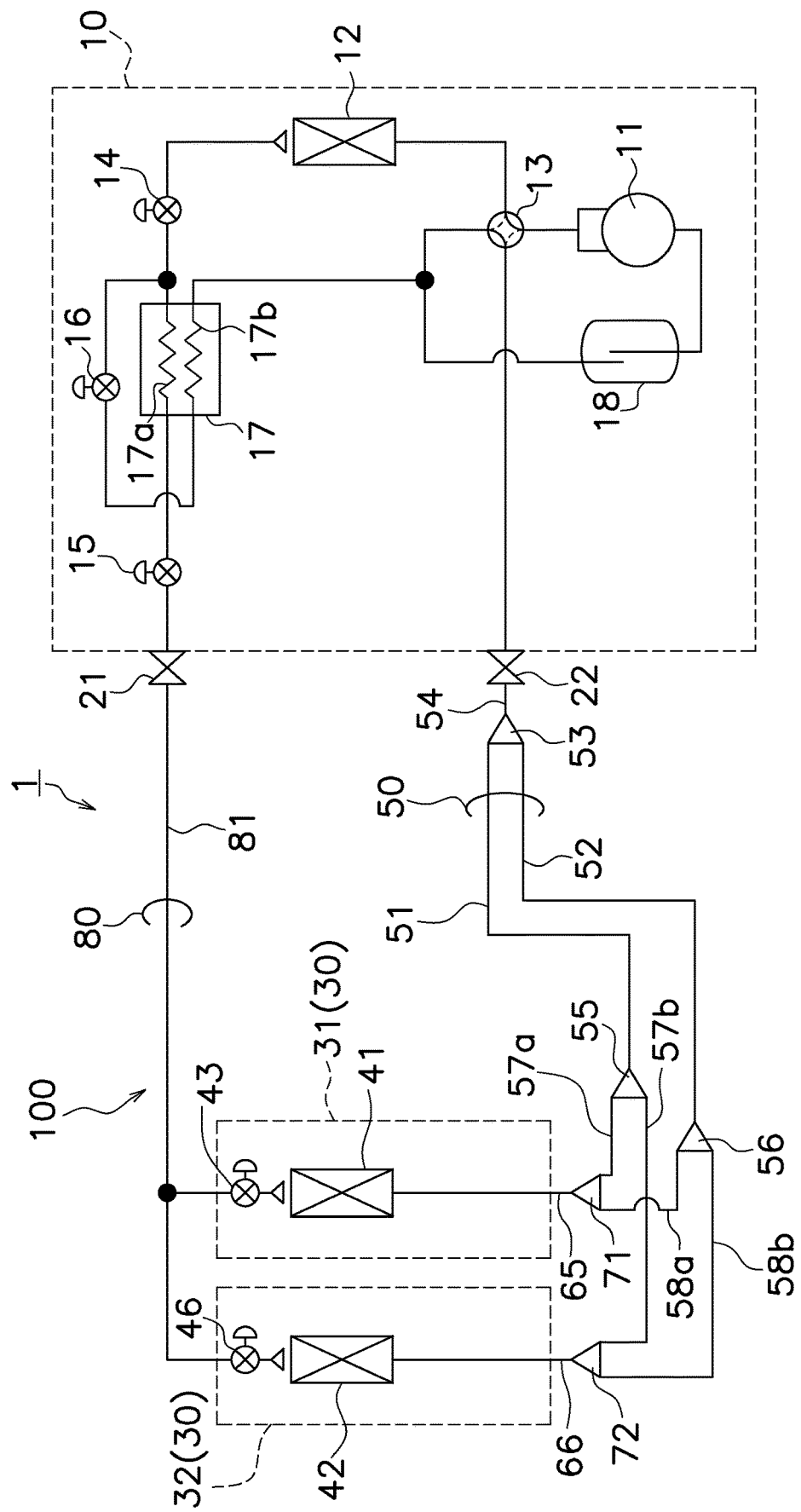
FIG. 4 is a circuit diagram showing another example of a structure of the air conditioner according to Modification C.

However, as shown in FIGS. 3 and 4, refrigerants may merge or a refrigerant may be split outside the first use unit 31 or the second use unit 32. When such a structure is formed, an air conditioner 1 in FIG. 3 includes a fourth branch pipe 71 and a joint 65. A first in and out port of the fourth branch pipe 71 and the other inlet/outlet of the first use-side heat exchanger 41 are connected to each other by the joint 65. The other end of the first connection pipe 51 is connected to a second in and out port of the fourth branch pipe 71, and the other end of the second connection pipe 52 is connected to a third in and out port of the fourth branch pipe 71.

In a heating operation, a refrigerant flows into both of the first connection pipe 51 and the second connection pipe 52 as refrigerants from the heat source unit 10, and the refrigerants that each flow in a corresponding one of both of the first connection pipe 51 and the second connection pipe 52 merge at the fourth branch pipe 71. The merged refrigerant formed at the fourth branch pipe 71 flows into the first use unit 31 via the joint 65. In a cooling operation, a refrigerant flows to the fourth branch pipe 71 via the joint 65 from the first use unit 31. At the fourth branch pipe 71, the refrigerant that has flowed out of the first use unit 31 is split into refrigerants, and the refrigerants flow into a corresponding one of both of the first connection pipe 51 and the second connection pipe 52. In the cooling operation, both refrigerants that each flow in a corresponding one of the first connection pipe 51 and the second connection pipe 52 each further flow to the heat source unit 10 from the corresponding one of the first connection pipe 51 and the second connection pipe 52.

An air conditioner 1 in FIG. 4 includes a fourth branch pipe 71, a fifth branch pipe 72, joints 65 and 66, and refrigerant pipes 57a, 57b, 58a, and 58b. A first in and out port of the fourth branch pipe 71 and the other inlet/outlet of the first use-side heat exchanger 41 are connected to each other by the joint 65. A first in and out port of the fifth branch pipe 72 and the other inlet/outlet of the second use-side heat exchanger 42 are connected to each other by the joint 66. A second in and out port of the second branch pipe 55 is connected to a second in and out port of the fourth branch pipe 71 by the refrigerant pipe 57a, and a second in and out port of the third branch pipe 56 is connected to a third in and out port of the fourth branch pipe 71 by the refrigerant pipe 58a. A third in and out port of the second branch pipe 55 is connected to a second in and out port of the fifth branch pipe 72 by the refrigerant pipe 57b, and a third in and out port of the third branch pipe 56 is connected to a third in and out port of the fifth branch pipe 72 by the refrigerant pipe 58b. The joints 65 and 66 and the refrigerant pipes 57a, 57b, 58a, and 58b are short metallic pipes, such as short copper pipes, and are shorter than the first connection pipe 51 and the second connection pipe 52. Note that, in the air conditioners 1 in FIGS. 3 and 4, the fourth branch pipe 71 and the fifth branch pipe 72 may be directly connected to a corresponding one of the first use unit 31 and the second use unit 32 without using a corresponding one of the joints 65 and 66.

In a heating operation, a refrigerant flows to both of the first connection pipe 51 and the second connection pipe 52 from the heat source unit 10. The refrigerant that flows in the first connection pipe 51 is split at the second branch pipe 55. The refrigerant that flows in the second connection pipe 52 is split at the third branch pipe 56. A part of the refrigerant that has been split off at the second branch pipe 55 and a part of the refrigerant that has been split off at the third branch pipe 56 merge at the fourth branch pipe 71, and the merged refrigerant flows in the first use unit 31. The remaining part of the refrigerant that has been split off at the second branch pipe 55 and the remaining part of the refrigerant that has been split off at the third branch pipe 56 merge at the fifth branch pipe 72, and the merged refrigerant flows in the second use unit 32.

In a cooling operation, a refrigerant flows to the fourth branch pipe 71 via the joint 65 from the first use unit 31. A refrigerant flows to the fifth branch pipe 72 via the joint 66 from the second use unit 32. At the fourth branch pipe 71, the refrigerant that has flowed out of the first use unit 31 is split into parts. The parts of the split refrigerant each flow into a corresponding one of the second branch pipe 55 and third branch pipe 56 via a corresponding one of the refrigerant pipes 57a and 58a. At the fifth branch pipe 72, the refrigerant that has flowed out of the second use unit 32 is split into parts. The parts of the split refrigerant each flow into a corresponding one of the second branch pipe 55 and third branch pipe 56 via a corresponding one of the refrigerant pipes 57b and 58b. A part of the refrigerant that has flowed out of the first use unit 31 and a part of the refrigerant that has flowed out of the second use unit 32 merge at the second branch pipe 55, and the merged refrigerant flows in the first connection pipe 51. The remaining part of the refrigerant that has flowed out of the first use unit 31 and the remaining part of the refrigerant that has flowed out of the second use unit 32 merge at the third branch pipe 56, and the merged refrigerant flows in the second connection pipe 52. In other words, the refrigerant that has flowed out of the first use unit 31 flows in both of the first connection pipe 51 and the second connection pipe 52 via the fourth branch pipe 71, the second branch pipe 55, and the third branch pipe 56. The refrigerant that has flowed out of the second use unit 32 flows in both of the first connection pipe 51 and the second connection pipe 52 via the fifth branch pipe 72, the second branch pipe 55, and the third branch pipe 56.

(7-4) Modification D

In the first embodiment, the second embodiment, and the modifications above, the main pipes of the first connection path 50 are described as being constituted by two connection pipes, that is, the first connection pipe 51 and the second connection pipe 52. However, the main pipe parts of the first connection flow path 50 are not limited to two main pipe parts and may be three or more main pipe parts.

(7-5) Modification E

In the embodiments and the modifications above, the single pipe 54 has been described as being shorter than the first connection pipe 51 and the second connection pipe 52 and as having a length of, for example, 1 m or less. However, the single pipe 54 may be longer than the first connection pipe 51 and the second connection pipe 52 and may have a length that is, for example, greater than 1 m.

Figure 5:
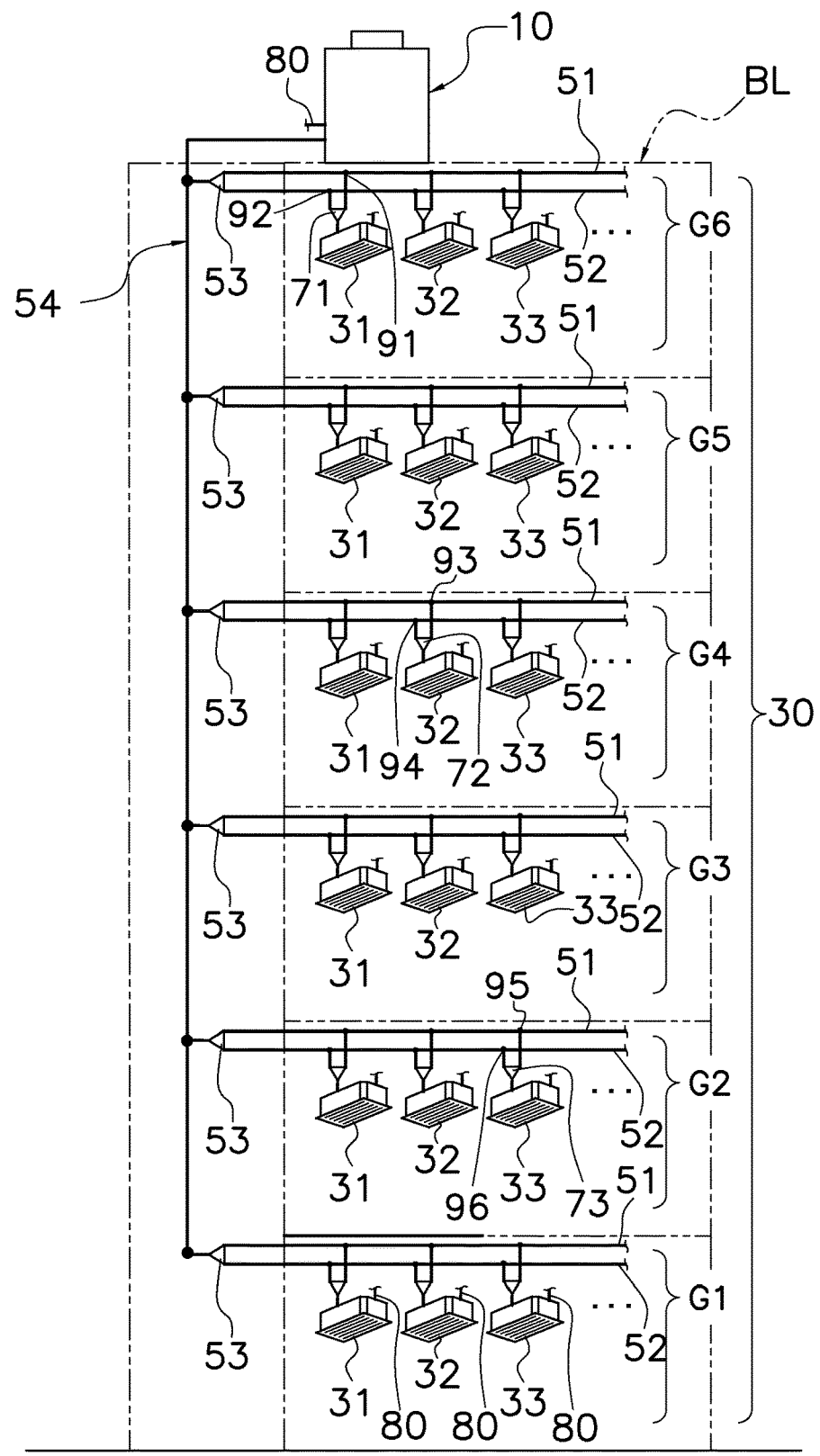
FIG. 5 is a schematic view showing an example of a structure of an air conditioner according to Modification E.

For example, as shown in FIG. 5, the heat source unit 10 is installed on a roof of a building BL. A first use unit 31, a second use unit 32, a third use unit 33, and the other use units (a fourth use unit and units in the order after the fourth use unit are not shown) are disposed on each of a first floor G1 to a sixth floor G6. Here, for simplifying the description, the structures of and pipe installations with respect to the first use unit 31, the second use unit 32, the third use unit 33, and the other use units on each of the first floor G1 to the sixth floor G6 are described as being the same. In FIG. 5, a part of the second connection flow path 80 is not shown.

The single pipe 54 that is connected to the heat source unit 10 extends to the first floor G1 from the roof. A first connection pipe 51 and a second connection pipe 52 are installed so as to be separated from the single pipe 54 on each of the first floor G1, the second floor G2, the third floor G3, the fourth floor G4, the fifth floor G5, and the sixth floor G6.

When a flow of a refrigerant at the time of a heating operation is taken as an example, for example, a refrigerant discharged from one heat source unit 10 passes along the single pipe 54 (vertical connection pipe) and is split at a first branch pipe 53 on the sixth floor G6.

On the sixth floor G6, as shown by symbols, the refrigerant that has been split at the first branch pipe 53 flows in the first connection pipe 51 and the second connection pipe 52 that are installed on the sixth floor G6, and is split by a second branch pipe 91 and a third branch pipe 92 on the sixth floor 6G. A part of the refrigerant that has been split off at the second branch pipe 91 and a part of the refrigerant that has been split off at the third branch pipe 92 merge at a fourth branch pipe 71 that is connected to the first use unit 31 on the sixth floor G6, and the merged refrigerant flows in the first use unit 31 on the sixth floor G6. Here, although a description is given with regard to only the first use unit 31 on the sixth floor G6, a refrigerant also flows to the first use unit 31 on each of the first floor G1 to the fifth floor G5 via a first branch pipe 53, a second branch pipe 91, a third branch pipe 92, and a fourth branch pipe 71 as in the case of the first use unit 31 on the sixth floor G6.

On the fourth floor G4, as shown by symbols, the refrigerant that has been split at a first branch pipe 53 flows in the first connection pipe 51 and the second connection pipe 52 that are installed on the fourth floor G4, and is split by a second branch pipe 93 and a third branch pipe 94 on the fourth floor G4. A part of the refrigerant that has been split off at the second branch pipe 93 and a part of the refrigerant that has been split off at the third branch pipe 94 merge at a fifth branch pipe 72 that is connected to the second use unit 32 on the fourth floor G4, and the merged refrigerant flows in the second use unit 32 on the fourth floor G4. Here, although a description is given with regard to only the second use unit 32 on the fourth floor G4, a refrigerant also flows to the second use unit 32 on each of the first floor G1 to the third floor G3, the fifth floor G5, and the sixth floor G6 via a first branch pipe 53, a second branch pipe 93, a third branch pipe 94, and a fifth branch pipe 72 as in the case of the second use unit 32 on the fourth floor G4.

On the second floor G2, as shown by symbols, the refrigerant that has been split at a first branch pipe 53 flows in the first connection pipe 51 and the second connection pipe 52 that are installed on the second floor G2, and is split by a second branch pipe 95 and a third branch pipe 96 on the second floor G2. A part of the refrigerant that has been split off at the second branch pipe 95 and a part of the refrigerant that has been split off at the third branch pipe 96 merge at a sixth branch pipe 73 that is connected to the third use unit 33 on the second floor G2, and the merged refrigerant flows in the third use unit 33 on the second floor G2. Here, although a description is given with regard to only the third use unit 33 on the second floor G2, a refrigerant also flows to the third use unit 33 on each of the first floor G1 and the third floor G3 to the sixth floor G6 via a first branch pipe 53, a second branch pipe 95, a third branch pipe 96, and a sixth branch pipe 73 as in the case of the third use unit 33 on the second floor G2. Note that, since the structure of each third use unit 33 is the same as the structures of each first use unit 31 and each second use unit 32, here, the structure of each third use unit 33 is not described.

Note that, in order to make it possible to perform sophisticated pipe installations, an O material may be used for the first connection pipe 51 and the second connection pipe 52 on each of the floors G1, G2, G3, G4, G5, and G6.

(7-6) Modification F

Figure 6:
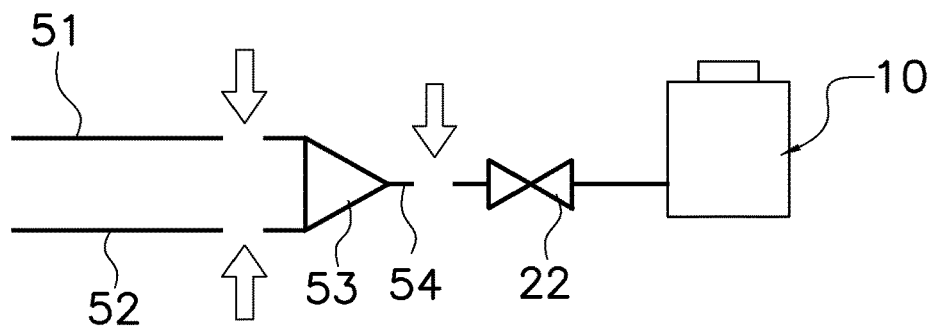
FIG. 6 is a schematic view for describing brazing for installing a first connection pipe and a second connection pipe.

FIG. 6 schematically shows an example of a method of connecting the shutoff valve 22 of the heat source unit 10 shown in FIG. 4 to the first branch pipe 53, the first connection pipe 51, and the second connection pipe 52. In the example shown in FIG. 6, the first branch pipe 53 has the single pipe 54. In this case, a site worker performs brazing on three portions indicated by thick arrows in FIG. 6 at the place of installation of the heat source unit 10. When the single pipe 54 is prepared separately from the first branch pipe 53, the site worker needs to perform brazing on four portions.

Figure 7:
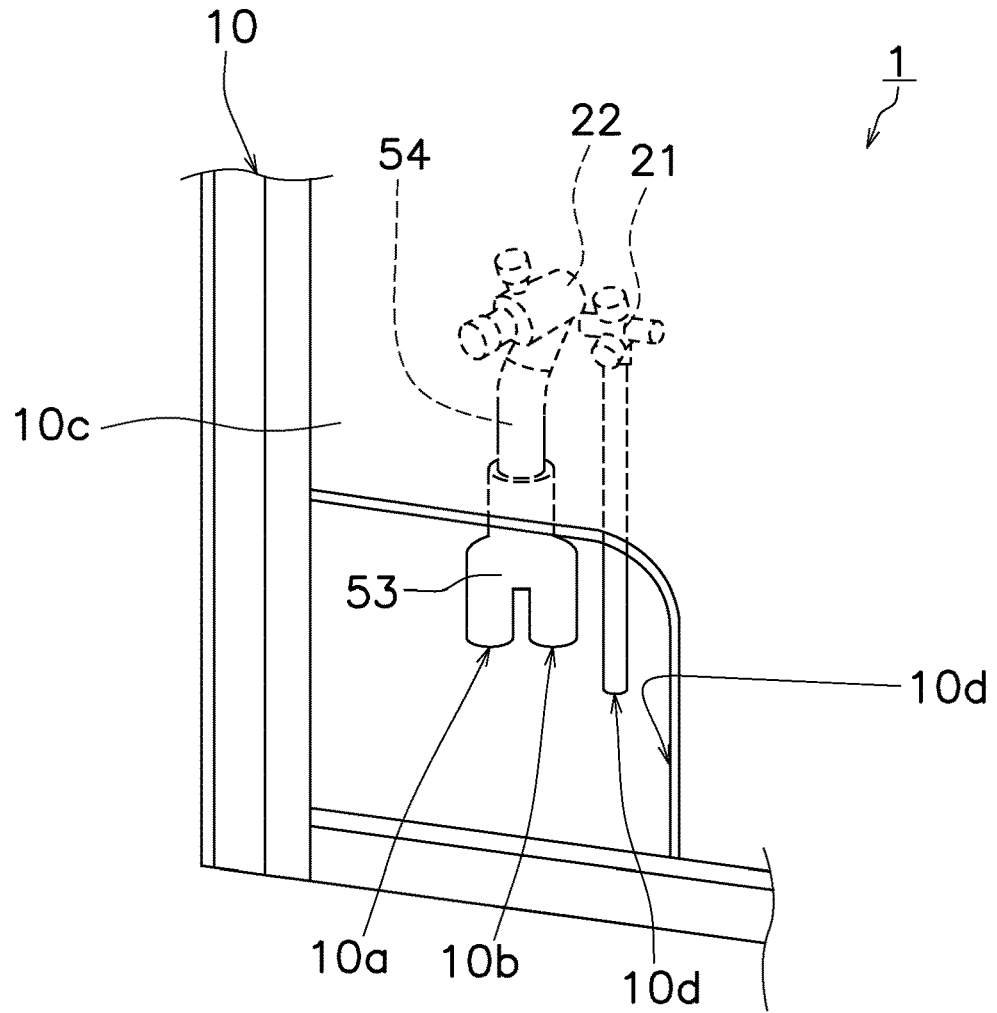
FIG. 7 is a partial enlarged perspective view of a heat source unit according to Modification F.
Figure 8:
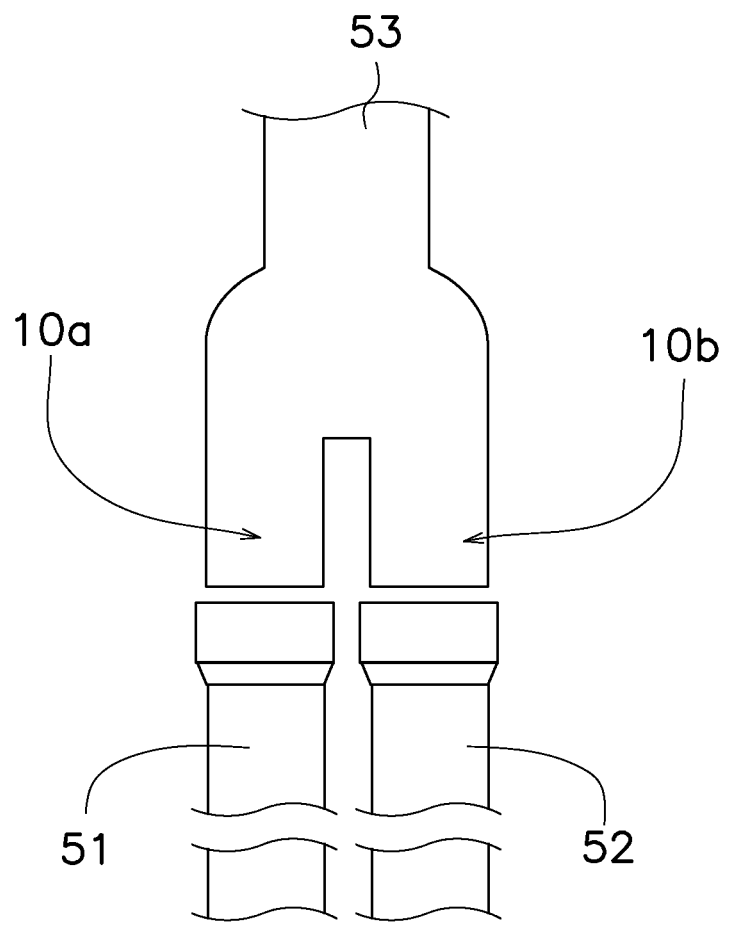
FIG. 8 is a partial enlarged view showing a first connection part and a second connection part of the heat source unit in FIG. 7.

Therefore, an air conditioner 1 according to Modification F includes a heat source unit shown in FIG. 7. The heat source unit 10 in FIG. 7 has a heat-source-unit casing 10c. The compressor 11 and the heat-source-side heat exchanger 12 shown in FIG. 4 are accommodated in the heat-source-unit casing 10c. As shown in FIGS. 7 and 8, the heat source unit 10 has a first connection part 10a that is connected to the first connection pipe 51, and a second connection part 10b that is connected to the second connection pipe 52. The first connection part 10a and the second connection part 10b are two separated connection portions extending from the shutoff valve 22. It is possible to say that a structure corresponding to the first branch pipe 53 having the first connection part 10a and the second connection part 10b and to the single pipe 54 is connected to the shutoff valve 22 and is accommodated in the heat-source-unit casing 10c. Therefore, a refrigerant that flows via the shutoff valve 22 flows in each of the first connection part 10a and the second connection part 10b. The specific enthalpy of the refrigerant that flows via the shutoff valve 22 is larger than the specific enthalpy of a refrigerant that flows via the shutoff valve 21. The first connection part 10a and the second connection part 10b are each disposed in the heat-source-unit casing 10c. A third connection part 10d that communicates with the shutoff valve 21 is disposed in the heat-source-unit casing 10c. The third connection part 10d is connected to the metallic pipe 81 of the second connection flow path 80. The first connection part 10a, the second connection part 10b, and the third connection part 10d are covered and protected by the heat-source-unit casing 10c so as not to be directly exposed to wind and rain. In order to facilitate connection of the first connection pipe 51 and the second connection pipe 52, the first connection part 10a, the second connection part 10b, and the third connection part 10d are disposed near an opening 10e of the heat-source-unit casing 10c.

(7-7) Modification G

Figure 9A:
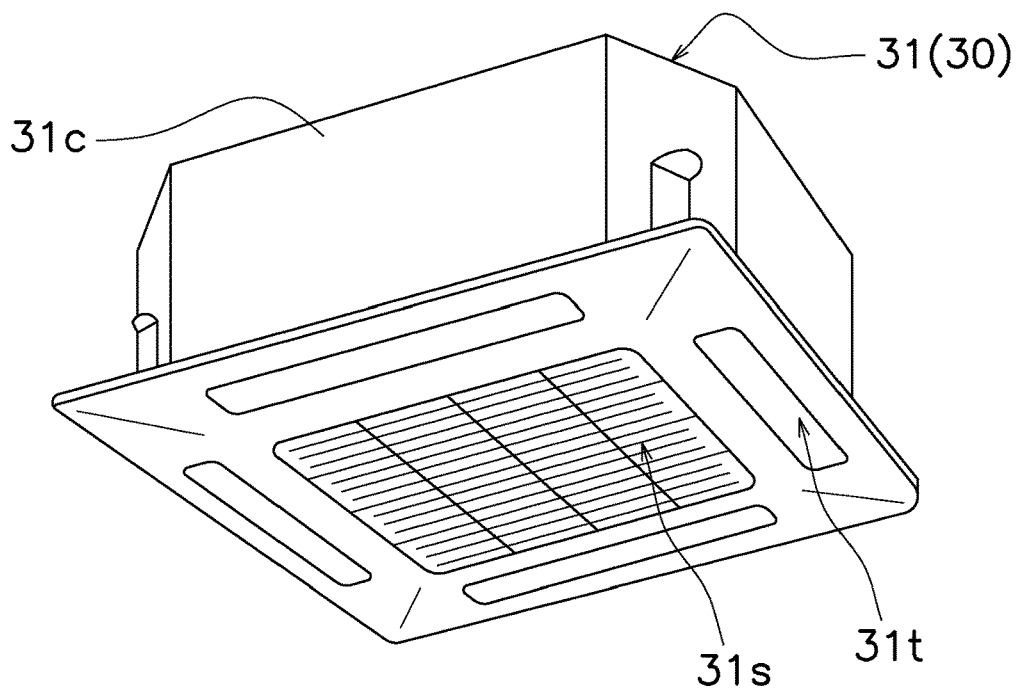
FIG. 9A is a perspective view showing an example of a first use unit according to Modification G.
Figure 9B:
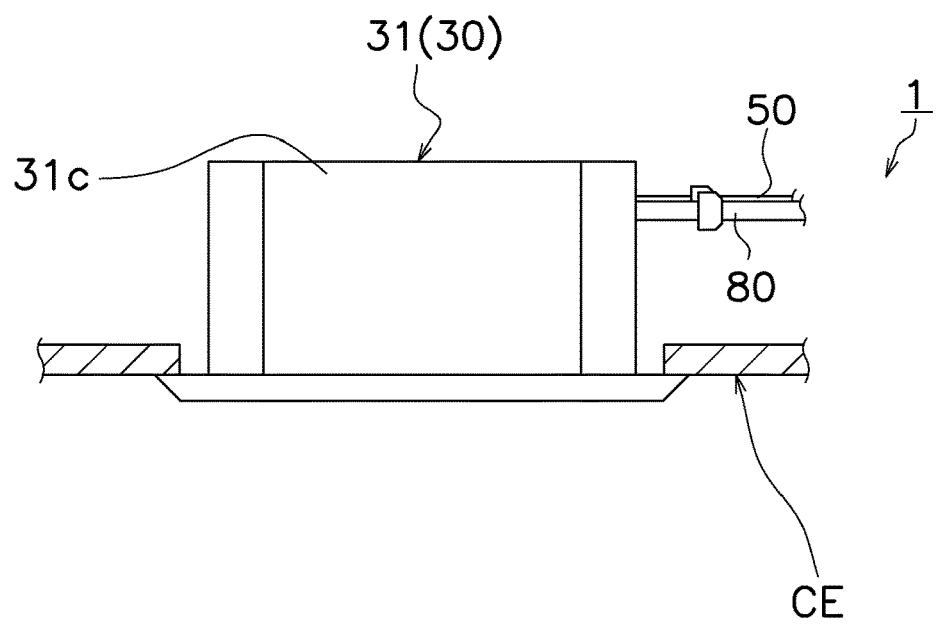
FIG. 9B is a side view of the first use unit in FIG. 9A.
Figure 10:
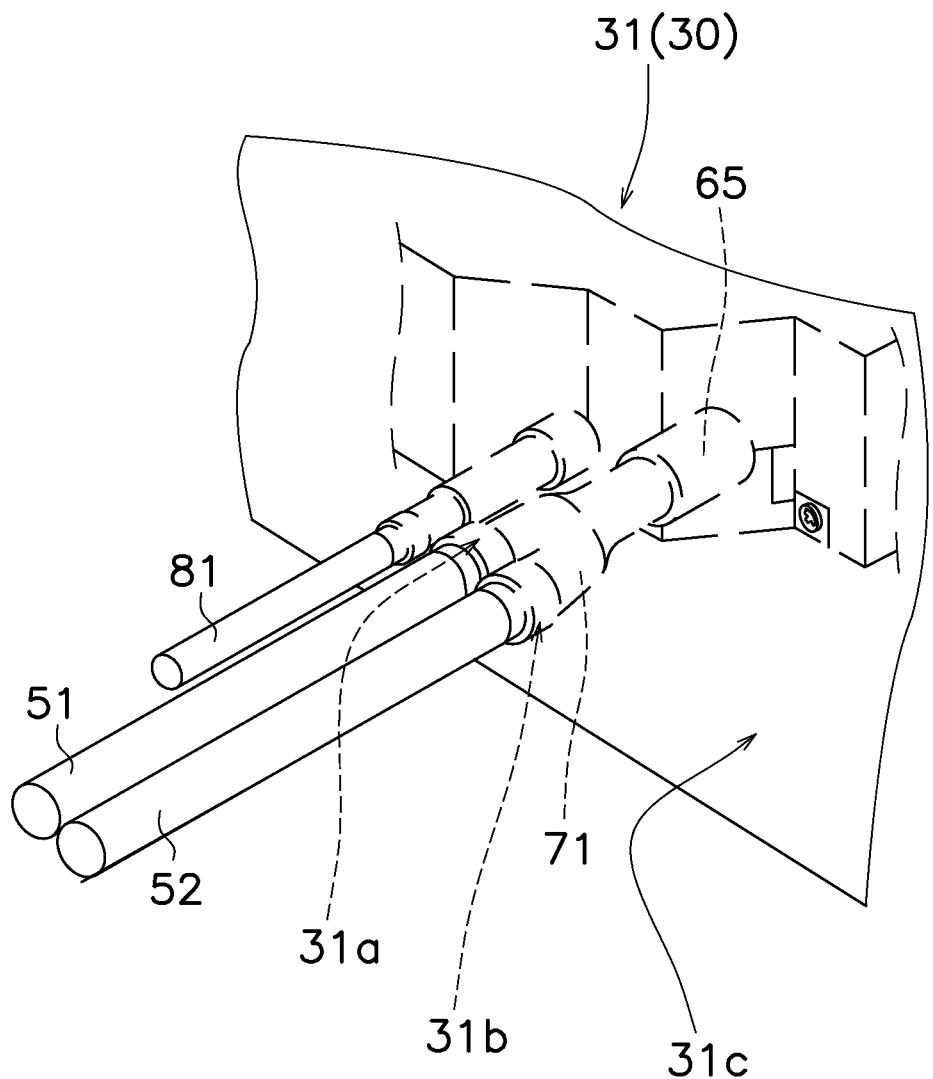
FIG. 10 is a partial enlarged view of the first use unit in FIG. 9A.

FIGS. 9A and 9B shows an indoor unit that is installed on a ceiling with the first use unit 31 shown in FIG. 4 being used as an example. An air conditioner 1 according to Modification G includes a first use unit 31 shown in FIGS. 9A and 9B. The first use unit 31 in FIGS. 9A and 9B has a first-use-unit casing 31c. The first use-side heat exchanger 41 shown in FIG. 4 is accommodated in the first-use-unit casing 31c. The first use unit 31 sucks in indoor air from a lower-side suction port 31s facing the interior of a room, and, after heat exchange at the first use-side heat exchanger 41 disposed in the interior, blows out conditioned air from a blow-out port 31t. As shown in FIG. 10, the first use unit 31 has a first connection part 31a that is connected to the first connection pipe 51, and a second connection part 31b that is connected to the second connection pipe 52. The first connection part 31a and the second connection part 31b are two separated connection portions extending from the other inlet/outlet of the first use-side heat exchanger 41. It is possible to say that a structure corresponding to the fourth branch pipe 71 having the first connection part 31a and the second connection part 31b and to the joint 65 is connected to the first use-side heat exchanger 41 and is accommodated in the first-use-unit casing 31c. Therefore, a refrigerant that flows via the other inlet/outlet of the first use-side heat exchanger 41 flows in each of the first connection part 31a and the second connection part 31b. The specific enthalpy of the refrigerant that flows via the other inlet/outlet of the first use-side heat exchanger 41 is larger than the specific enthalpy of a refrigerant that flows via one inlet/outlet of the first use-side heat exchanger 41 that is connected to the indoor expansion valve 43. The first connection part 31a and the second connection part 31b are each disposed in the first-use-unit casing 31c. Since, unlike the heat source unit 10 that is disposed outdoors, the first use unit 31 is installed indoors, the first connection part 31a and the second connection part 31b may be disposed outside the first-use-unit casing 31c. A third connection part 31d that communicates with the indoor expansion valve 43 may be disposed in the first-use-unit casing 31c. The third connection part 31d is connected to the metallic pipe 81 of the second connection flow path 80. At the first use unit 31, the third connection part 31d may be disposed outside the first-use-unit casing 31c.

Note that the structure of the heat source unit 10 of Modification F and the structure of the first use unit 31 of Modification G may be simultaneously applied to one air conditioner 1.

(7-8) Modification H

Figure 11:
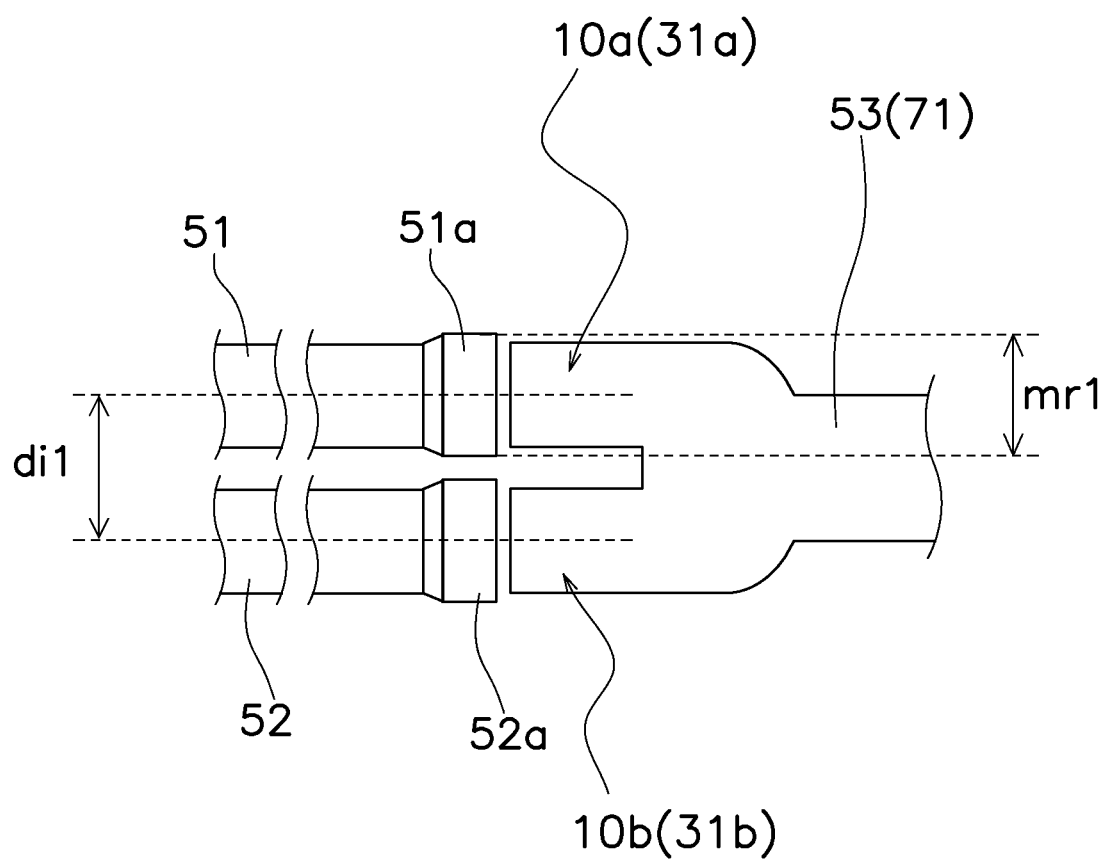
FIG. 11 is a partial enlarged view showing an example of a first connection part and a second connection part according to Modification H.

FIG. 11 shows another form of each of the first connection part 10a and the second connection part 10b shown in FIG. 7 and another form of each of the first connection part 31a and the second connection part 31b shown in FIG. 10. The structural concept of the other form of each of the first connection part 10a and the second connection part 10b and the structural concept of the other form of each of the first connection part 31a and the second connection part 31b are the same. Therefore, in the description below, the other form of each of the first connection part 10a and the second connection part 10b is described, and the other form of the first connection part 31a and the second connection part 31b is not described.

The first connection part 10a and the second connection part 10b have an expanded first connection end 51a and an expanded second connection end 52a, respectively. The inside diameter of the expanded first connection end 51a is substantially equal to the outside diameters of the first connection parts 10a and 31a, and the inside diameter of the expanded second connection end 52a is substantially equal to the outside diameters of the second connection parts 10b and 31b. At the time of brazing, in order to reduce the amount of heat that escapes to an adjacent connection part, the first connection parts 10a and 31a and the corresponding second connection parts 10b and 31b are offset from each other in a pipe diameter direction of the first connection pipe 51 by a first prescribed value mr1 or more. In other words, a displacement amount di1 between the first connection parts 10a and 31a and the corresponding second connection parts 10b and 31b is greater than or equal to the prescribed value mr1 in the pipe diameter direction. In the description above, the displacement amount di1 in the pipe diameter direction has been described as a displacement amount between the first connection parts 10a and 31a and the corresponding second connection parts 10b and 31b. However, from a different point of view, the first connection end 51a of the first connection pipe 51 and the second connection end 52a of the second connection pipe 52 may be understood as being disposed by the displacement amount di1 greater than or equal to the prescribed value mr1 in the pipe diameter direction of the first connection pipe 51.

Figure 12A:
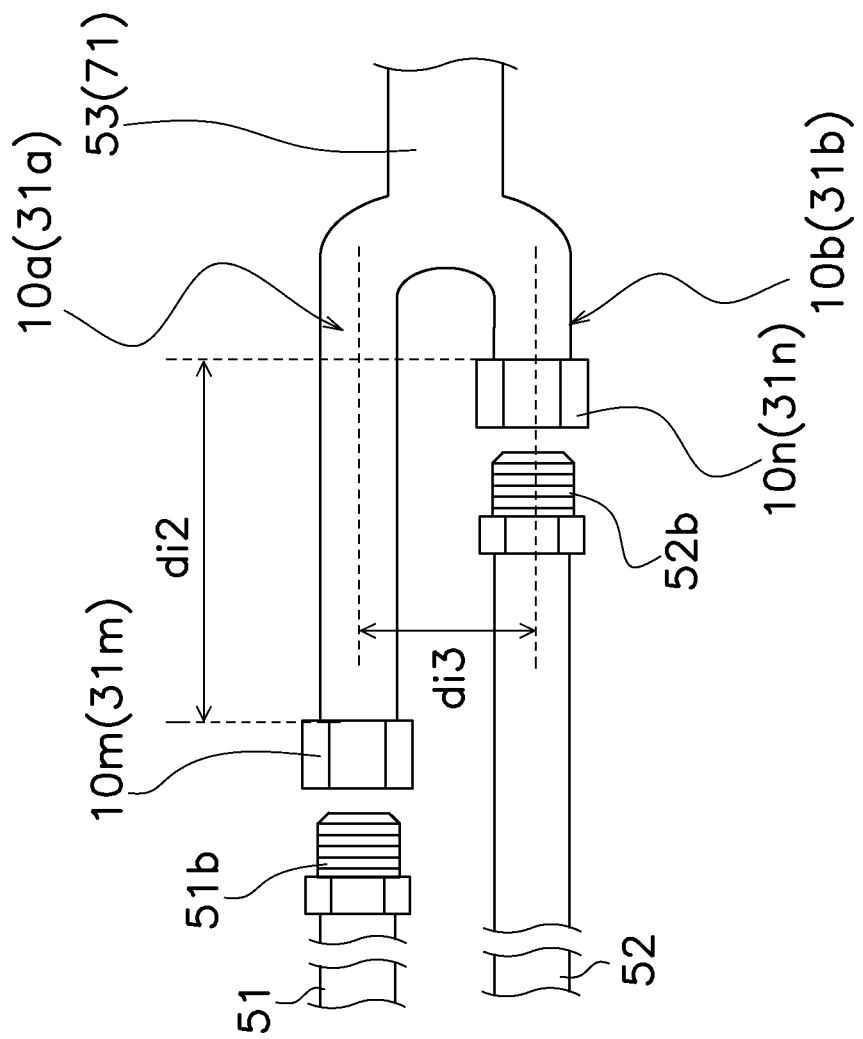
FIG. 12A is a partial enlarged view showing another example of the first connection part and the second connection part according to Modification H.
Figure 12B:
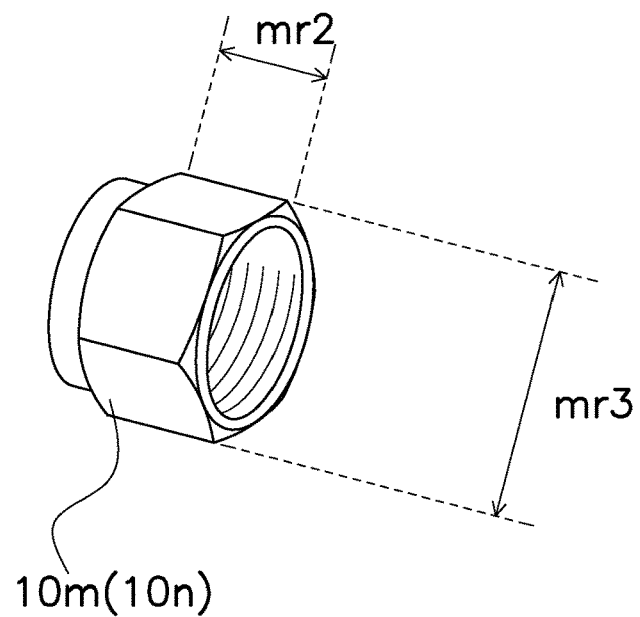
FIG. 12B is a partial enlarged perspective view showing in enlarged form a part of the first connection part and the second connection part in FIG. 12A.

FIGS. 12A and 12B show another form of each of the first connection part 10a and the second connection part 10b shown in FIG. 7 and another form of each of the first connection part 31a and the second connection part 31b shown in FIG. 10. The first connection part 10a has at an end thereof a connection end 10m that is connected to a first connection end 51b of the first connection pipe 51. The connection end 10m and the first connection end 51b are fastening components that are fastened to each other. More specifically, the connection end 10m of the first connection part 10a is a hexagon nut, and the first connection end 51b of the first connection pipe 51 is a hexagon bolt. The second connection part 10b has at an end thereof a connection end 10n that is connected to a second connection end 52b of the second connection pipe 52. The connection end 10n and the second connection end 52b are fastening components that are fastened to each other. More specifically, the connection end 10n of the second connection part 10b is a hexagon nut, and the second connection end 52b of the second connection pipe 52 is a hexagon bolt.

A displacement amount di2 in a pipe diameter direction of the first connection part 10a shown in FIG. 12A is set to be greater than or equal to a prescribed value mr2 in a pipe axis direction shown in FIG. 12B. In this case, the prescribed value mr2 in the pipe axis direction is the height of the hexagon nut. A displacement amount di3 in the pipe diameter direction of the first connection part 10a shown in FIG. 12A is set to be greater than or equal to a prescribed value mr3 in the pipe diameter direction shown in FIG. 12B. In this case, the prescribed value mr3 in the pipe diameter direction is a diagonal distance of the hexagon nut. In the description above, the displacement amount di2 in the pipe axis direction has been described as a displacement amount between the connection ends 10m and 10n. However, from a different point of view, the first connection end 51b and the second connection end 52b may be understood as being disposed by the displacement amount di2 greater than or equal to the prescribed value mr2 in the pipe axis direction of the first connection pipe 51. In addition, the first connection end 51b and the second connection end 52b may be understood as being disposed by the displacement amount di3 greater than or equal to the prescribed value mr3 in the pipe diameter direction of the first connection pipe 51. As long as at least one of such prescribed value mr2 in the pipe axis direction and such prescribed value mr3 in the pipe diameter direction is provided, a tool for fastening the connection end 10m and the first connection end 51b to each other and the connection end 10n and the second connection end 52b to each other, in this case, a hexagon wrench can be used. As long as both the prescribed value mr2 in the pipe axis direction and the prescribed value mr3 in the pipe diameter direction are provided, it is possible to smoothly fasten the connection end 10m and the first connection end 51b to each other and the connection end 10n and the second connection end 52b to each other by using the tool.

Figure 13:
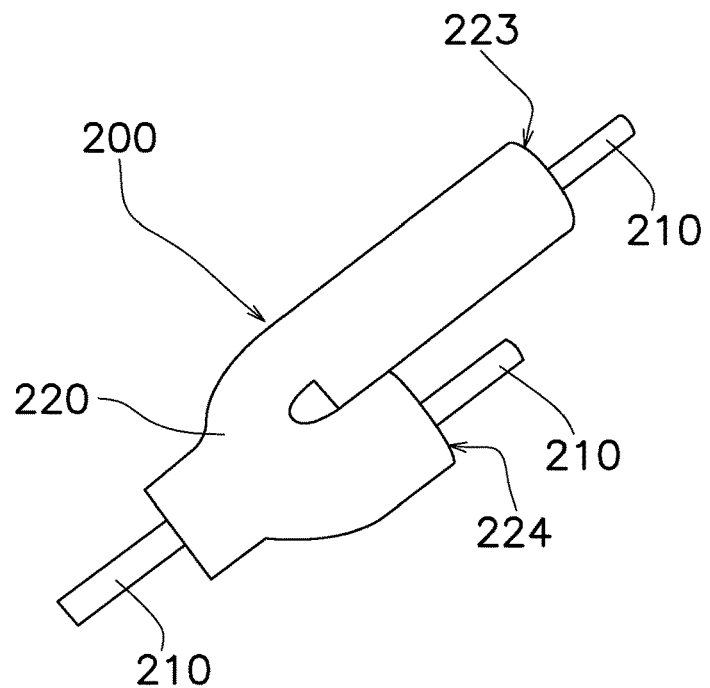
FIG. 13 is a perspective view of a branch socket according to Modification H.
Figure 14:
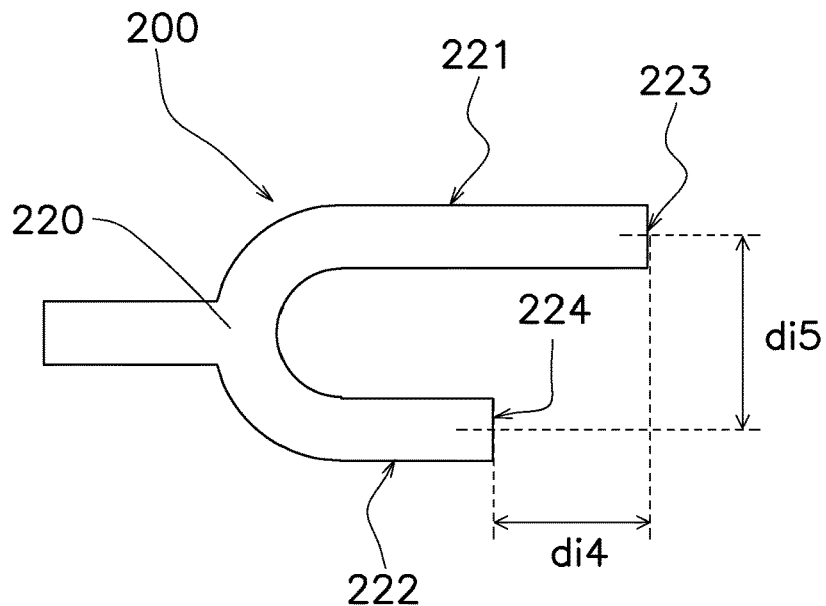
FIG. 14 is a plan view for describing displacement of ends of the branch socket in FIG. 13.
Figure 15A:
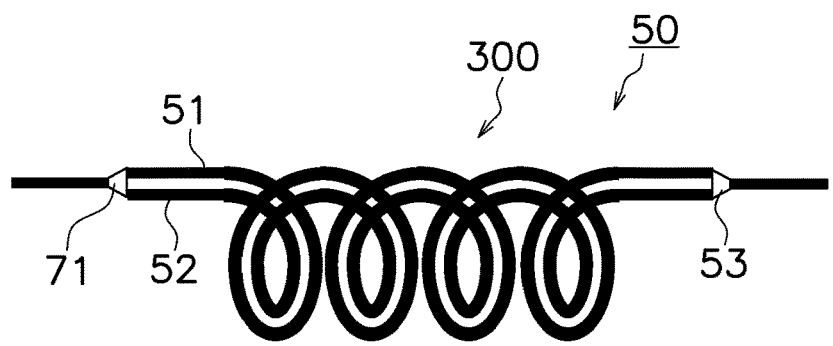
FIG. 15A is a schematic view showing an example of a special-purpose coil according to Modification I.
Figure 15B:
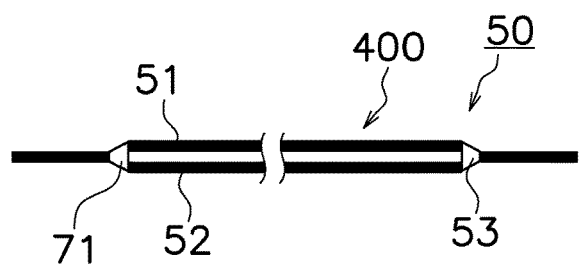
FIG. 15B is a schematic view showing an example of a special-purpose straight pipe according to Modification I.
Figure 16A:
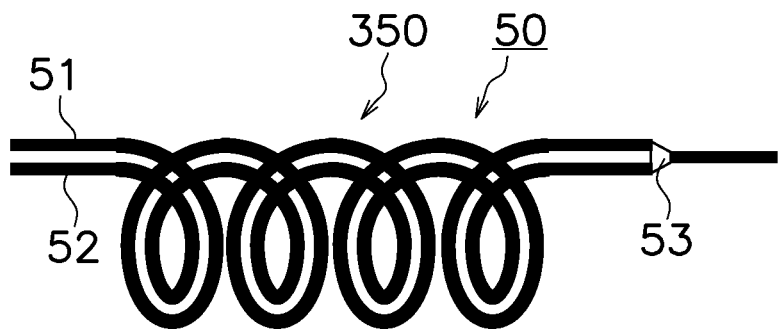
FIG. 16A is a schematic view showing another example of the special-purpose coil according to Modification I.
Figure 16B:
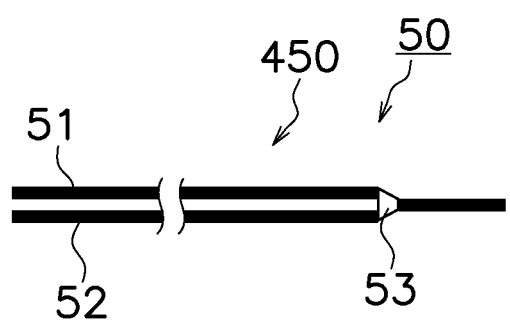
FIG. 16B is a schematic view showing another example of the special-purpose straight pipe according to Modification I.

Regarding the first connection end 51b of the first connection pipe 51 and the second connection end 52b of the second connection pipe 52, in order to provide the displacement amount di2 in the pipe axis direction and the displacement amount di3 in the pipe diameter direction, a branch socket 200, shown in FIGS. 13 and 14, may be used.

The branch socket 200 includes a Y-shaped copper pipe 210 and a Y-shaped heat-insulating section 220 that covers the copper pipe 210. Here, although the branch socket 200 including the copper pipe 210 is described, the copper pipe 210 may be substituted by another metallic pipe. The heat-insulating section 220 is made of, for example, resin. The heat-insulating section 220 has two separated columnar portions 221 and 222 extending in the same direction. An end 223 of the longer columnar portion 221 and an end 224 of the shorter columnar portion 222 are offset from each other by an amount di4 in a pipe axis direction of the copper pipe 210. The displacement amount di4 is set to be greater than or equal to the first prescribed value mr2. The ends 223 and 224 are offset from each other by an amount di5 in a pipe diameter direction of the copper pipe 210. The displacement amount di5 is set to be greater than or equal to the third prescribed value mr3. The first connection pipe 51 and the second connection pipe 52 having the same length are brazed to the copper pipe 210 by being inserted up to the ends 223 and 224 of the two corresponding columnar portions 221 and 222. Regarding the first connection pipe 51 and the second connection pipe 52 that have been inserted in this way, the first connection end 51b and the second connection end 52b, which are ends differing from the brazed ends, can be fixed at the positions shown in FIG. 12A.

(7-9) Modification I

In the first embodiment, the second embodiment, and the modifications above, the case in which, at an installation site of the air conditioner 1, the first connection pipe 51 and the second connection pipe 52 are brazed to, for example, the first branch pipe 53 has been described. However, special-purpose coils 300 and 350 and special-purpose straight pipes 400 and 450 that are shown in a corresponding one of FIGS. 15A, 15B, 16A, and 16B and in which connection pipes and branch pipes are previously connected and fixed may be prepared. The special-purpose coils 300 and 350 and the special-purpose straight pipes 400 and 450 differ from each other in that a first connection pipe 51 and a second connection pipe 52 of each of the special-purpose coils 300 and 350 are spirally formed, whereas a first connection pipe 51 and a second connection pipe 52 of each of the special-purpose straight pipes 400 and 450 are linearly formed. Regarding the special-purpose coils 300 and 350, a site worker can stretch and contract the special-purpose coils 300 and 350 by changing the lengths of the first connection pipe 51 and the second connection pipe 52.

The special-purpose coil 300 and the special-purpose straight pipe 400 are each, for example, one product in which the first connection pipe 51, the second connection pipe 52, the first branch pipe 53, and the fourth branch pipe 71 of the first connection flow path 50, which are shown in FIG. 3, are previously integrated all at once. Such a special-purpose coil 300 and such a special-purpose straight pipe 400 are manufactured at, for example, a factory. The special-purpose coil 300 and the special-purpose straight pipe 400 are transported, for example, to an installation site of the air conditioner 1 from the factory. Therefore, by using the special-purpose coil 300 or the special-purpose straight pipe 400, it is possible to omit brazing of two branch pipes and two connection pipes at the installation site of the air conditioner 1.

The special-purpose coil 350 and the special-purpose straight pipe 450 are each, for example, one product in which the first connection pipe 51, the second connection pipe 52, and the first branch pipe 53 of the first connection flow path 50, which are shown in FIGS. 1 to 4, are previously integrated all at once. Such a special-purpose coil 350 and such a special-purpose straight pipe 450 are manufactured at, for example, a factory. The special-purpose coil 350 and the special-purpose straight pipe 450 are transported, for example, to an installation site of the air conditioner 1 from the factory. Therefore, by using the special-purpose coil 350 or the special-purpose straight pipe 450, it is possible to omit brazing of one branch pipe and two connection pipes at the installation site of the air conditioner 1.

Note that the special-purpose coils 300 and 350 and the special-purpose straight pipes 400 and 450 may incorporate the single pipe 54. The special-purpose coil 350 and the special-purpose straight pipe 450 may be used in parts of the first connection pipe 51, the second connection pipe 52, and the fourth branch pipe 71. The special-purpose coil 350 and the special-purpose straight pipe 450 may be used in portions of the joints 61 and 62 and the second branch pipe 55 shown in FIG. 2, or in portions of the joints 63 and 64 and the third branch pipe 56 shown in FIG. 2.

(7-10) Modification J

Figure 17:
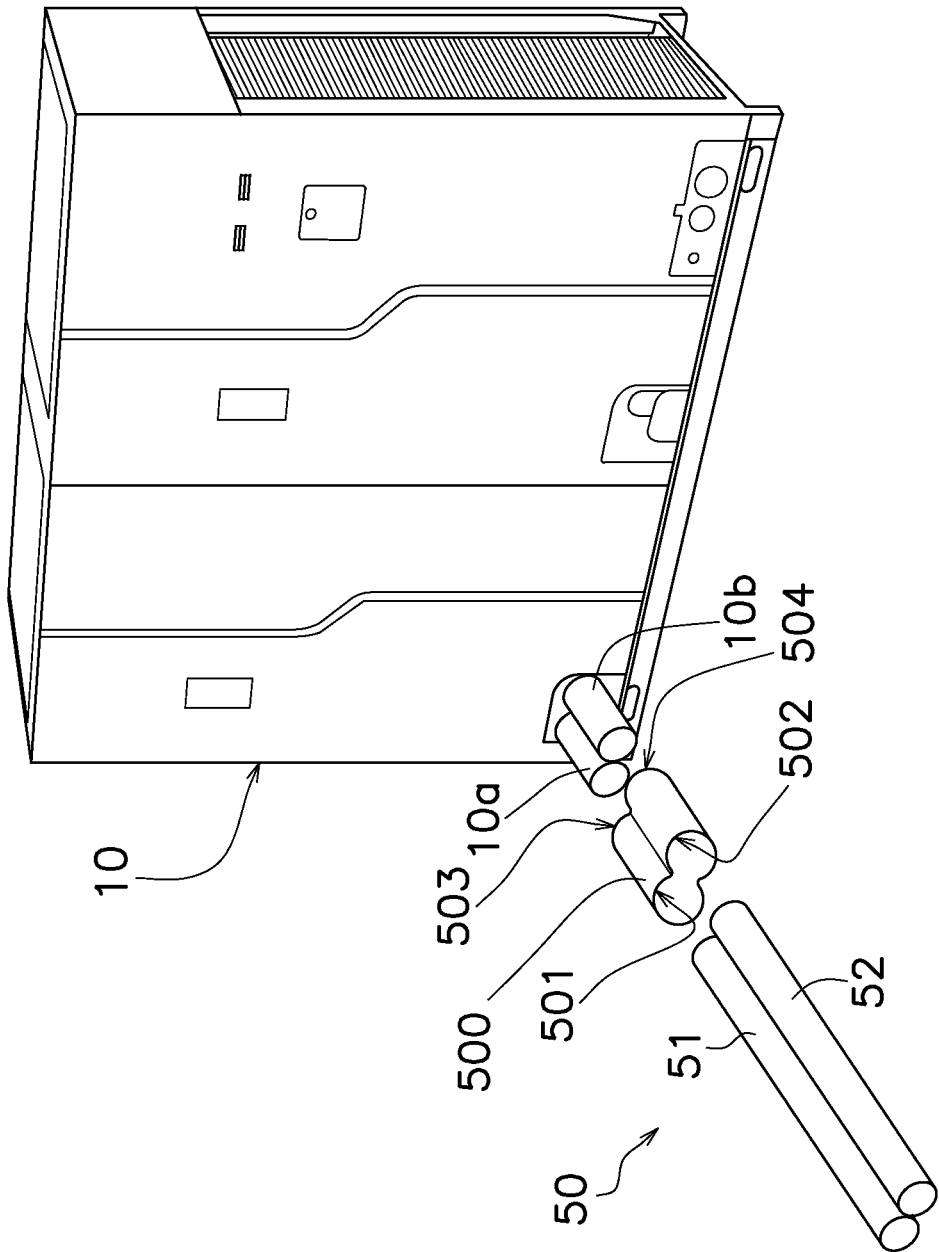
FIG. 17 is a perspective view showing an example of a special-purpose socket.

In the first embodiment, the second embodiment, and the modifications above, the case in which, when the air conditioner 1 is to be installed at an installation site, an end portion of one pipe and an end portion of one pipe are brazed to each other has been described. However, the first connection pipe 51 and the second connection pipe 52 may be connected to each other by using a special-purpose socket that is capable of brazing a plurality of pipes all at once. FIG. 17 shows the first connection pipe 51 and the second connection pipe 52 and the first connection part 10a and the second connection part 10b of the heat source unit 10 being connected to a special-purpose socket 500. The special-purpose socket 500 is made of, for example, a metal, such as copper or stainless steel. The special-purpose socket 500 is formed by, for example, deforming a metallic cylindrical body. The special-purpose socket 500 includes a first insertion part 501 having an inside diameter substantially equal to the outside diameter of the first connection pipe 51, a second insertion part 502 having an inside diameter substantially equal to the outside diameter of the second connection pipe 52, a third insertion part 503 having an inside diameter substantially equal to the outside diameter of the first connection part 10a, and a fourth insertion part 504 having an inside diameter substantially equal to the outside diameter of the second connection part 10b. The first connection pipe 51, the second connection pipe 52, the first connection part 10a, and the second connection part 10b are inserted into and brazed to the first insertion part 501, the second insertion part 502, the third insertion part 503, and the fourth insertion part 504 of the special-purpose socket 500, respectively. In this case, the first connection pipe 51, the second connection pipe 52, the first connection part 10a, and the second connection part 10b, that is, four components can be used by two brazing operations. As a result of the brazing operations, a refrigerant is prevented from leaking outside the special-purpose socket 500, the first connection pipe 51, the second connection pipe 52, the first connection part 10a, and the second connection part 10b. Therefore, not only a portion where an end portion of the special-purpose socket 500, the first connection pipe 51, and the second connection pipe 52 are close to each other, but also a portion of the end portion of the special-purpose socket 500 close to the first connection pipe 51 and the second connection pipe 52 is sealed by a brazing material. Similarly, not only a portion where an end portion of the special-purpose socket 500, the first connection part 10a, and the second connection part 10b are close to each other, but also a portion of the end portion of the special-purpose socket 500 close to the first connection part 10a and the second connection part 10b is sealed by a brazing material. When connection by such a special-purpose socket 500 is performed, a refrigerant primarily flows between the first connection pipe 51 and the first connection part 10a and between the second connection pipe 52 and the second connection part 10b. However, a refrigerant is allowed to leak in the special-purpose socket 500. For example, when a refrigerant flows to the first connection pipe 51 and the second connection pipe 52 from the heat source unit 10, a refrigerant that has exited from the first connection part 10a need not be made to flow only to the first connection pipe 51 and may be made to flow to the second connection pipe 52. Similarly, a refrigerant that has exited from the second connection part 10b may be made to flow to the first connection pipe 51.

Here, the case in which the first connection flow path 50 including two connection pipes, that is, the first connection pipe 51 and the second connection pipe 52, which are disposed in parallel, is connected by the special-purpose socket 500 has been described.

However, the number of connection pipes of the first connection flow path 50 that can be connected by a special-purpose socket is not limited to two. When the first connection flow path 50 includes three or more connection pipes, the three or more connection pipes may be brazed all at once by one special-purpose socket. Here, although the case in which the first connection pipe 51 and the first connection part 10a are connected to each other and the second connection pipe 52 and the second connection part 10b are connected to each other by the special-purpose socket 500 has been described, what can be connected by the special-purpose socket 500 is not limited to the first connection part 10*a* and the second connection part 10*b* of the heat source unit 10. For example, the first connection pipe 51 and the first connection part 31*a* of the first use unit 31 may be connected to each other and the second connection pipe 52 and the second connection part 31*b* of the first use unit 31 may be connected to each other by the special-purpose socket 500.

(7-11) Modification K

Figure 18:
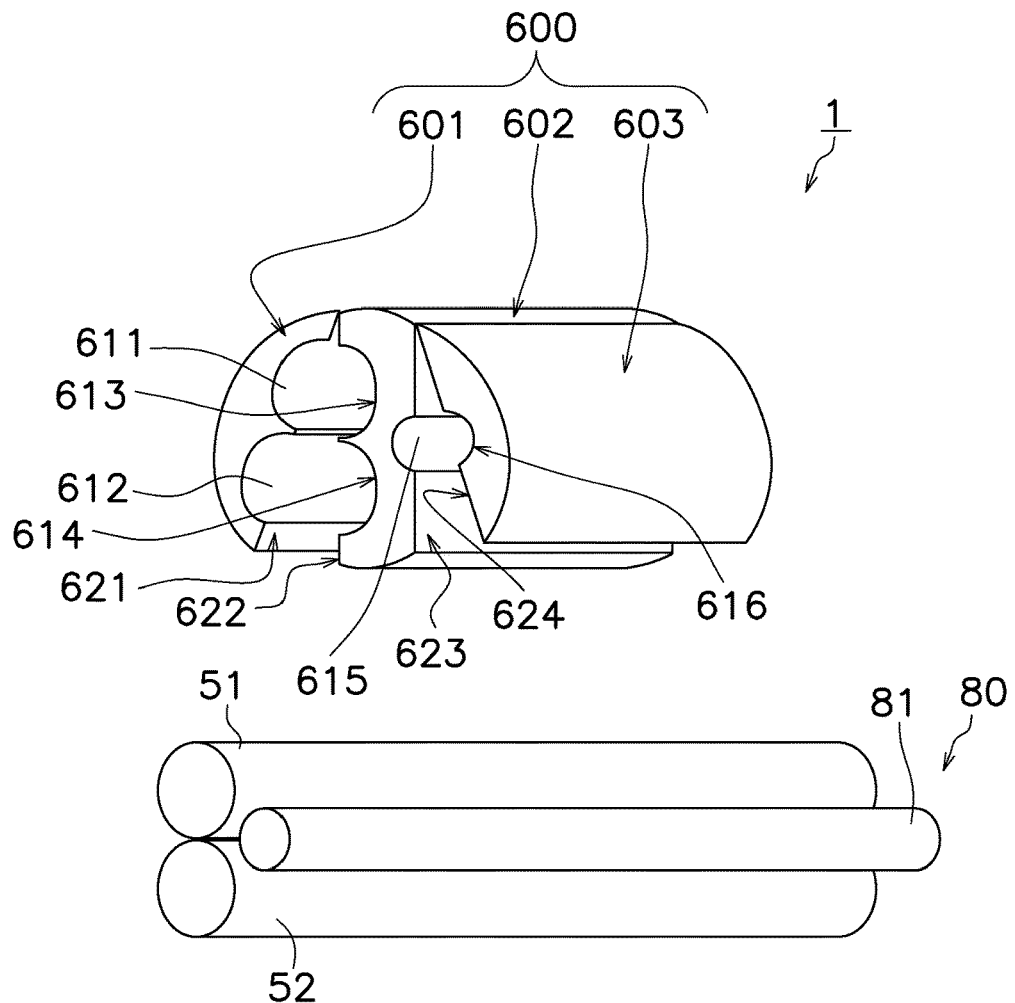
FIG. 18 is a perspective view showing heat-insulating materials according to Modification K.
Figure 19:
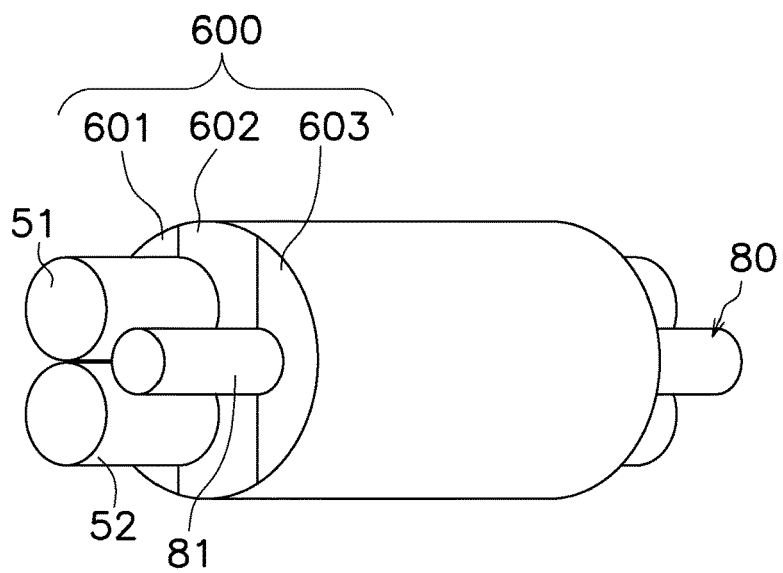
FIG. 19 is a perspective view showing a mounted state of a first connection pipe, a second connection pipe, and a metallic pipe in the heat-insulating materials in FIG. 18.

In the air conditioners 1 according to the first embodiment, the second embodiment, and the modifications above, the number of pipes included in the first connection flow path 50 is larger than that in air conditioners known in the art. Therefore, in order to reduce the time and effort to thermally insulate the first connection flow path 50, as shown in FIG. 18 and FIG. 19, the air conditioner 1 is constituted to include heat-insulating materials 601, 602, and 603. The heat-insulating materials 601, 602, and 603 have corresponding ones of grooves 611 to 616 that correspond with a corresponding one of the first connection pipe 51, the second connection pipe 52, and the metallic pipe 81 of the second connection flow path 80. A heat-insulating-material assembly 600 is one in which the first heat-insulating material 601, the second heat-insulating material 602, and the third heat-insulating material 603 have been assembled. The first heat-insulating material 601 has the grooves 611 and 612, which correspond to the first connection pipe 51 and the second connection pipe 52, respectively, in a first surface 621. The second heat-insulating material 602 has the grooves 613 and 614, which correspond to the first connection pipe 51 and the second connection pipe 52, respectively, in a first surface 622. The second heat-insulating material 602 has the groove 615, which corresponds to the metallic pipe 81, in a second surface 623 on a side opposite to the first surface 622. The third heat-insulating material 603 has the groove 616, which corresponds to the metallic pipe 81, in a first surface 624. When the first heat-insulating material 601, the second heat-insulating material 602, and the third heat-insulating material 603 are assembled, a column having three holes is formed. The materials of the heat-insulating materials 601, 602, and 603 are hard resin or semi-hard resin, or materials that are moldable and stretchable and contractible.

The first surface 621 of the first heat-insulating material 601 and the first surface 622 of the second heat-insulating material 602 are put together and the first connection pipe 51 and the second connection pipe 52 are sandwiched by the heat-insulating materials 601 and 602. The first connection pipe 51 is fitted to the groove 611 of the heat-insulating material 601 and the groove 613 of the heat-insulating material 602. The grooves 611 and 613 are put together and form a columnar hole. The diameter of the hole formed by the grooves 611 and 613 is substantially the same as or slightly larger than the outside diameter of the first connection pipe 51. Therefore, the heat-insulating materials 601 and 602 can cover a periphery of the first connection pipe 51. The second connection pipe 52 is fitted to the groove 612 of the heat-insulating material 601 and the groove 614 of the heat-insulating material 602. The grooves 612 and 614 are put together and form a columnar hole. The diameter of the hole formed by the grooves 612 and 614 is substantially the same as or slightly larger than the outside diameter of the second connection pipe 52. Therefore, the heat-insulating materials 601 and 602 can cover a periphery of the second connection pipe 52.

The second surface 623 of the second heat-insulating material 602 and the first surface 624 of the third heat-insulating material 603 are put together and the metallic pipe 81 is sandwiched by the heat-insulating materials 602 and 603. The metallic pipe 81 is fitted to the groove 615 of the heat-insulating material 602 and the groove 616 of the heat-insulating material 603. The grooves 615 and 616 are put together and form a columnar hole. The diameter of the hole formed by the grooves 615 and 616 is substantially the same as or slightly larger than the outside diameter of the metallic pipe 81. Therefore, the heat-insulating materials 602 and 603 can cover a periphery of the metallic pipe 81.

(7-12) Modification L

The second branch pipe 55 and the third branch pipe 56 in FIG. 2 may be constituted to be accommodated in a heat-insulating-material assembly 700 including a first heat-insulating material 701 and a second heat-insulating material 702 and described below using FIGS. 20 and 21.

The heat-insulating material 701 has a plurality of grooves 711 corresponding to the second branch pipe 55, and the heat-insulating material 702 has a plurality of grooves 712 corresponding to the third branch pipe 56. The heat-insulating-material assembly 700 is one in which the first heat-insulating material 701 and the second heat-insulating material 702 have been assembled. The first heat-insulating material 701 has the grooves 711, which correspond to the second branch pipe 55, in a first surface 721. The second heat-insulating material 702 has the grooves 712, which correspond to the third branch pipe 56, in a first surface 722. When the first heat-insulating material 701 and the second heat-insulating material 702 are assembled, a Y-shaped member having two Y-shaped holes is formed. The materials of the heat-insulating materials 701 and 702 are hard resin or semi-hard resin, or materials that are moldable and stretchable and contractible. The first surface 721 of the first heat-insulating material 701 and the first surface 722 of the second heat-insulating material 702 are put together and the second branch pipe 55 and the third branch pipe 56 are sandwiched by the heat-insulating materials 701 and 702. The second branch pipe 55 is fitted to the grooves 711 of the heat-insulating material 701. Each groove 711 is deeper than the height of the second branch pipe 55. Therefore, a periphery of the second branch pipe 55 is covered by the first heat-insulating material 701. The third branch pipe 56 is fitted to the grooves 712 of the heat-insulating material 702. Each groove 712 is deeper than the height of the third branch pipe 56. Therefore, a periphery of the third branch pipe 56 is covered by the second heat-insulating material 702. The second branch pipe 55 and the third branch pipe 56 are joint portions of the first connection pipe 51 and the second connection pipe 52.

Figure 22:
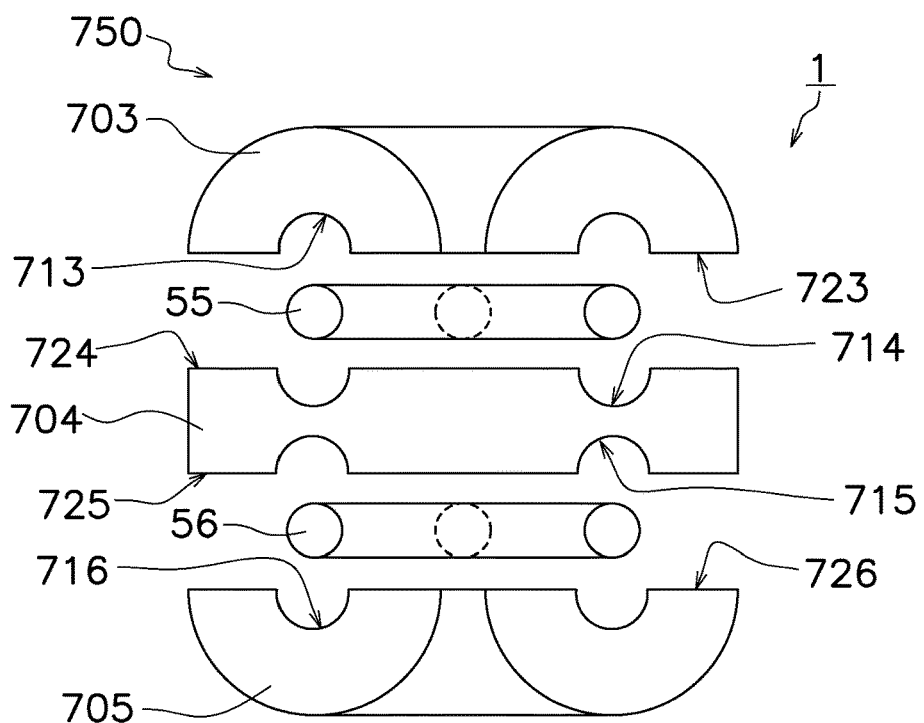
FIG. 22 is a front view showing another example of each heat-insulating material in FIG. 20.

As shown in FIG. 22, the second branch pipe 55 and the third branch pipe 56 may be covered by two of a heat-insulating material 703, a heat-insulating material 704, and a heat-insulating material 705. As shown in FIG. 22, the air conditioner 1 is constituted to include the heat-insulating materials 703, 704, and 705. The heat-insulating material 703 has a plurality of grooves 713 corresponding to the second branch pipe 55, the heat-insulating material 704 has a plurality of grooves 714 and 715 corresponding to a corresponding one of the second branch pipe 55 and the third branch pipe 56, and the heat-insulating material 705 has a plurality of grooves 716 corresponding to the third branch pipe 56. A heat-insulating-material assembly 750 is one in which the first heat-insulating material 703, the second heat-insulating material 704, and the third heat-insulating material 705 have been assembled. The first heat-insulating material 703 has the grooves 713, which correspond to the second branch pipe 55, in a first surface 723. The second heat-insulating material 704 has the grooves 714, which correspond to the second branch pipe 55, in a first surface 724. The second heat-insulating material 704 has the grooves 715, which correspond to the third branch pipe 56, in a second surface 725 on a side opposite to the first surface 724. The third heat-insulating material 705 has the grooves 716, which correspond to the third branch pipe 56, in a first surface 726. When the first heat-insulating material 703, the second heat-insulating material 704, and the third heat-insulating material 705 are assembled, a Y-shaped member having two Y-shaped holes is formed. The materials of the heat-insulating materials 703, 704, and 705 are hard resin or semi-hard resin, or materials that are moldable and stretchable and contractible.

The first surface 723 of the first heat-insulating material 703 and the first surface 724 of the second heat-insulating material 704 are put together and the second branch pipe 55 is sandwiched by the heat-insulating materials 703 and 704. The second branch pipe 55 is fitted to the grooves 713 of the heat-insulating material 703 and the grooves 714 of the heat-insulating material 704. The grooves 713 and 714 are put together and form a Y-shaped hole. The diameter of the hole formed by the grooves 713 and 714 is substantially the same as or slightly larger than the outside diameter of the second branch pipe 55. Therefore, the heat-insulating materials 703 and 704 can cover a periphery of the second branch pipe 55. The third branch pipe 56 is fitted to the grooves 715 of the heat-insulating material 704 and the grooves 716 of the heat-insulating material 705. The grooves 715 and 716 are put together and form a Y-shaped hole. The diameter of the hole formed by the grooves 715 and 716 is substantially the same as or slightly larger than the outside diameter of the third branch pipe 56. Therefore, the heat-insulating materials 704 and 705 can cover a periphery of the third branch pipe 56.

Here, a description has been given by taking the second branch pipe 55 and the third branch pipe 56 as examples of joint portions to which the heat-insulating materials 701 and 702 or the heat-insulating materials 703 to 705 are applied. However, the joint portions to which the heat-insulating materials 701 and 702 or the heat-insulating materials 703 to 705 are applied are not limited to the second branch pipe 55 and the third branch pipe 56. For example, with the fourth branch pipe 71 and the fifth branch pipe 72 shown in FIG. 4 as joint portions, heat-insulating materials, such as the heat-insulating materials 701 and 702 or the heat-insulating materials 703 to 705, may be applied to the fourth branch pipe 71 and the fifth branch pipe 72. The refrigerant pipes 57a and 57b can be considered as first connection pipes included in the first connection flow path 50, and the refrigerant pipes 58a and 58b can be considered as second connection pipes included in the first connection flow path 50.

(8) Features (8-1)

In the air conditioner 1, which is a refrigeration cycle device, described above, a refrigerant that flows between the heat source unit 10 and one first use unit 31 is divided by the first connection pipe 51 and the second connection pipe 52. A refrigerant that flows in the main pipe parts of the first connection flow path 50 at the time of a heating operation is a high-temperature, high-pressure refrigerant in a supercritical state or a high-temperature, high-pressure gas refrigerant having a pressure of 4.5 MPa or higher. Compared with when a main pipe part of the first connection flow path 50 in which such a high-temperature, high-pressure refrigerant flows is constituted by one connection pipe, it is possible to reduce the pipe diameters of the first connection pipe 51 and the second connection pipe 52, which constitute the main pipe parts. As a result, at a site, processing of the main pipe parts of the first connection flow path 50 constituted by the thin first connection pipe 51 and the thin second connection pipe 52 is facilitated. For example, the thin first connection pipe 51 and the thin second connection pipe 52 are easily bent along a building. When the air conditioner 1 is to be installed, work efficiency at the time of construction related to the first connection pipe 51 and the second connection pipe 52 is improved.

(8-2)

The thin first connection pipe 51 and the thin second connection pipe 52 above each may have an outside diameter of 12.7 mm or less. The first connection pipe 51 and the second connection pipe 52, which have an outside diameter of 12.7 mm or less, are easily processed. Therefore, the air conditioner 1 including the first connection pipe 51 and the second connection pipe 52, each having an outside diameter of 12.7 mm or less, can improve work efficiency at the time of construction.

(8-3)

In the air conditioner 1 of the second embodiment, since a large amount of refrigerant, which is the total amount of refrigerant that flows in one first use unit 31 and one second use unit 32, is divided by the first connection pipe 51 and the second connection pipe 52 and flows, compared with when a large amount of refrigerant in a plurality of use unit 30 flows in one connection pipe, the air conditioner 1 is considerably effective in facilitating construction by reducing the pipe diameters of the first connection pipe 51 and the second connection pipe 52.

(8-4)

The first connection flow path 50 of the air conditioner 1 above has main pipe parts including the first connection pipe 51 and the second connection pipe 52. The first connection pipe 51 and the second connection pipe 52, which are main pipe parts, are common to the first use unit 31 and the second use unit 32. For example, the first use unit 31 and the second use unit 32 may be disposed in a room on the first floor of a building and the heat source unit may be disposed on a roof of the building. In this case, the first connection pipe 51 and the second connection pipe 52, which are main pipe parts, are installed up to the room on the first floor of the building from the roof of the building. The first connection pipe 51 and the second connection pipe 52 that are installed in this way each have, for example, a length exceeding the height of the building. Even when the first connection pipe 51 and the second connection pipe 52 are constituted by connecting a plurality of straight pipes at a site, connection is facilitated by reducing the pipe diameters.

(8-5)

In the air conditioner 1 of the second embodiment, for example, when heating is performed at the second use unit 32 without performing heating at the first use unit 31, the first on-off valve 44, which is a first valve, and the second on-off valve 45, which is a second valve, are closed. When the first on-off valve 44 and the second on-off valve 45 are closed in this way, sound can be suppressed from being transmitted through the first connection pipe 51 and the second connection pipe 52 and propagation of sound to the first use unit 31. By suppressing sound that is transmitted to the first use unit 31 from the first connection pipe 51 and the second connection pipe 52, it is possible to improve quietness of the first use unit 31.

For example, when heating is performed at the first use unit 31 without performing heating at the second use unit 32, the first on-off valve 47, which is a first valve, and the second on-off valve 48, which is a second valve, are closed. When the first on-off valve 47 and the second on-off valve 48 are closed in this way, sound can be suppressed from being transmitted through the first connection pipe 51 and the second connection pipe 52 and propagation of sound to the second use unit 32. By suppressing sound that is transmitted to the second use unit 32 from the first connection pipe 51 and the second connection pipe 52, it is possible to improve quietness of the second use unit 32.

(8-6)

The air conditioners 1 according to the first embodiment and the second embodiment can, by combining the first connection pipe 51 and the second connection pipe 52 having different outside diameters, increase the range of selection of the first connection pipe 51 and the second connection pipe 52 suitable for the amount of refrigerant that flows. For example, the outside diameters of metallic pipes that can be supplied at all times by metallic pipe manufacturers are generally discrete. Therefore, when obtaining from a manufacturer metallic pipes used for the first connection pipe 51 and the second connection pipe 52 suitable for the amount of refrigerant that circulates in the air conditioner 1, a combination of metallic pipes having different outside diameters may be more suitable for the amount of refrigerant that circulates. When the outside diameters are selected so that a suitable pressure loss occurs at the first connection pipe 51 and the second connection pipe 52, the first connection pipe 51 and the second connection pipe 52 may be applied as those having different outside diameters to the air conditioner 1. In order to obtain a suitable pressure loss at the first connection pipe 51 and the second connection pipe 52, the flow path cross-sectional area that is the total of the flow path cross-sectional area of the first connection pipe 51 and the flow path cross-sectional area of the second connection pipe 52 may be larger than the flow path cross-sectional area of the single pipe 54.

(8-7)

As described in Modification D, the first connection flow path 50 may be constituted to include three or more connection pipes as main pipe parts. For example, when the first connection flow path 50 includes a third connection pipe in addition to the first connection pipe 51 and the second connection pipe 52, compared with when the first connection flow path 50 includes only the first connection pipe 51 and the second connection pipe 52, the outside diameter of each pipe can be further reduced. When the first connection flow path 50 includes the third connection pipe in addition to the first connection pipe 51 and the second connection pipe 52, for example, bending of the main pipe parts of the first connection flow path 50 is further facilitated compared with when the first connection flow path 50 includes two main pipe parts, and work efficiency at the time of construction is easily improved.

(8-8)

The air conditioner 1 of the first embodiment can, by causing a refrigerant to flow in the first connection pipe 51 by opening the first on-off valve 44 and not causing a refrigerant to flow in the second connection pipe 52 by closing the second on-off valve 45, increase the flow velocity of the refrigerant that flows in the first connection pipe 51 compared with that when the refrigerant is caused to flow in both connection pipes. By causing a refrigerant to flow in the second connection pipe 52 by opening the second on-off valve 45 and not causing a refrigerant to flow in the first connection pipe 51 by closing the first on-off valve 44, it is possible to increase the flow velocity of the refrigerant that flows in the second connection pipe 52 compared with that when the refrigerant is caused to flow in both connection pipes. In this way, by causing a refrigerant to flow in the first connection pipe 51 and the second connection pipe 52, for example, as long as a predetermined operating mode is an operating mode in which an oil return operation is performed, the air conditioner 1 of the first embodiment can end the oil return operation in a short time.

The air conditioner 1 of the second embodiment can, by causing a refrigerant to flow in the first connection pipe 51 by opening the first on-off valves 44 and 47 and not causing a refrigerant to flow in the second connection pipe 52 by closing the second on-off valves 45 and 48, increase the flow velocity of the refrigerant that flows in the first connection pipe 51 compared with that when the refrigerant is caused to flow in both connection pipes. By causing a refrigerant to flow in the second connection pipe 52 by opening the second on-off valves 45 and 48 and not causing a refrigerant to flow in the first connection pipe 51 by closing the first on-off valves 44 and 47, it is possible to increase the flow velocity of the refrigerant that flows in the second connection pipe 52 compared with that when the refrigerant is caused to flow in both connection pipes. In this way, by causing a refrigerant to flow in the first connection pipe 51 and the second connection pipe 52, for example, as long as a predetermined operating mode is an operating mode in which an oil return operation is performed, the air conditioner 1 of the second embodiment can end the oil return operation in a short time.

(8-9)

The air conditioner 1 may be constituted so that the covering color of the metallic pipe 81 differs from that of the connection pipe, among the first connection pipe 51 and the second connection pipe 52, whose outside diameter is substantially the same as that of the metallic pipe 81. In such a structure, even if the outside diameter of the first connection pipe 51 and/or the outside diameter of the second connection pipe 52 and the outside diameter of the metal pipe 81 are substantially the same, it is possible to reduce a mix-up of the metallic pipe 81 and the first connection pipe 51 and/or the second connection pipe 52 at the time of construction.

(8-10)

The air conditioner 1, which is a refrigeration cycle device, has the first connection part 10*a* or 31*a*, which is connected to the first connection pipe 51, and the second connection part 10*b* or 31*b*, which is connected to the second connection pipe 52, at at least one of the heat source unit 10 shown in FIG. 7 and the first use unit 31 shown in FIG. 10. The air conditioner 1 having such a structure makes it possible to directly connect the first connection pipe 51 and the second connection pipe 52 to at least one of the heat source unit 10 and the first use unit 31. As a result, it is possible to improve work efficiency of an installation worker at a site where the air conditioner 1 is to be installed.

(8-11)

As shown in FIGS. 7 and 10, the first connection part 10*a* or 31*a* and the second connection part 10*b* or 31*b* are disposed inside at least one of the heat-source-unit casing 10*c* and the first-use-unit casing 31*c*. The air conditioner 1 having such a structure is such that the first connection part 10*a* or 31*a* and the second connection part 10*b* or 31*b*, disposed inside at least one of the heat source casing 10*c* and the first use unit casing 31*c*, are protected by a corresponding one of the heat-source-unit casing 10*c* and the first-use-unit casing 31*c*.

(8-12)

As shown in FIG. 11 and FIG. 12A, the connection ends 10m and 31m of the corresponding first connection parts 10a and 31a are disposed so as to be offset from a corresponding one of the connection ends 10n and 31n of the corresponding second connection parts 10b and 31b by the prescribed value mr1 or more, mr2 or more, or mr3 or more in at least one of the pipe diameter direction and the pipe axis direction of a corresponding one of the first connection part 10a and the first connection part 31a. The air conditioner 1 having such a structure facilitates a connection operation or a brazing operation using a tool for the first connection parts 10a and 31a and the second connection parts 10b and 31b due to the connection end 10m of the first connection part 10a and the connection end 31m of the first connection part 31a being offset from a corresponding one of the connection end 10n of the second connection part 10b and the connection end 31n of the second connection part 31b by the prescribed value mr1 or more, mr2 or more, or mr3 or more in at least one of the pipe diameter direction and the pipe axis direction. As a result, it is possible to improve work efficiency of an installation worker at a site where the air conditioner 1 is to be installed.

(8-13)

The first connection pipe 51 has the first connection ends 51a and 51b into which a refrigerant flows from one of the heat source unit 10 and the first use unit 31. The second connection pipe 52 has the second connection ends 52a and 52b into which a refrigerant flows from one of the heat source unit 10 and the first use unit 31. The first connection parts 51a and 51b and the corresponding connection ends 52a and 52b are disposed so as to be offset from each other by the prescribed value mr1 or more, mr2 or more, or mr3 or more in at least one of the pipe diameter direction and the pipe axis direction of the first connection pipe 51. The air conditioner 1 having such a structure facilitates a connection operation or a brazing operation using a tool for the first connection pipe 51 and the second connection pipe 52 due to the first connection ends 51a and 51b and the corresponding second connection ends 52a and 52b being offset from each other by the prescribed value mr1 or more, mr2 or more, or mr3 or more in at least one of the pipe diameter direction and the pipe axis direction. As a result, it is possible to improve work efficiency of an installation worker at a site where the air conditioner 1 is to be installed.

(8-14)

The branch socket 200 in FIGS. 13 and 14 has a form that allows the first connection ends 51a and 51b and the corresponding connection ends 52a and 52b to be disposed so as to be offset from each other by the prescribed value mr1 or more, mr2 or more, or mr3 or more in at least one of the pipe diameter direction and the pipe axis direction of the first connection pipe 51 is realized. In the air conditioner 1 having such a structure, since the first connection ends 51a and 51b and the corresponding second connection ends 52a and 52b can be offset from each other by the prescribed value mr1 or more, mr2 or more, or mr3 or more due to the form of the branch socket 200, for example, a standard for the prescribed value of a gauge or the like is no longer required, as a result of which a connection operation of connecting the first connection pipe 51 and the second connection pipe 52 is facilitated.

(8-15)

The air conditioner 1 includes the plurality of heat-insulating materials 601, 602, and 603 having corresponding ones of grooves 611 to 616 that correspond with a corresponding one of the first connection pipe 51, the second connection pipe 52, and the metallic pipe 81 of the second connection flow path 80 shown in FIGS. 18 and 19. The plurality of heat-insulating materials 601 to 603 cover the periphery of a corresponding one or ones of the first connection pipe 51, the second connection pipe 52, and the second connection flow path 80. In this way, since it is possible to save time and effort to form the grooves 611 to 616 in a corresponding one of the heat-insulating materials 601 to 603 due to the grooves 611 to 616 of the corresponding one of the heat-insulating materials 601 to 603, it is possible to reduce the number of man hours for a heat-insulation operation using the heat-insulating materials 601 to 603.

(8-16)

Figure 20:
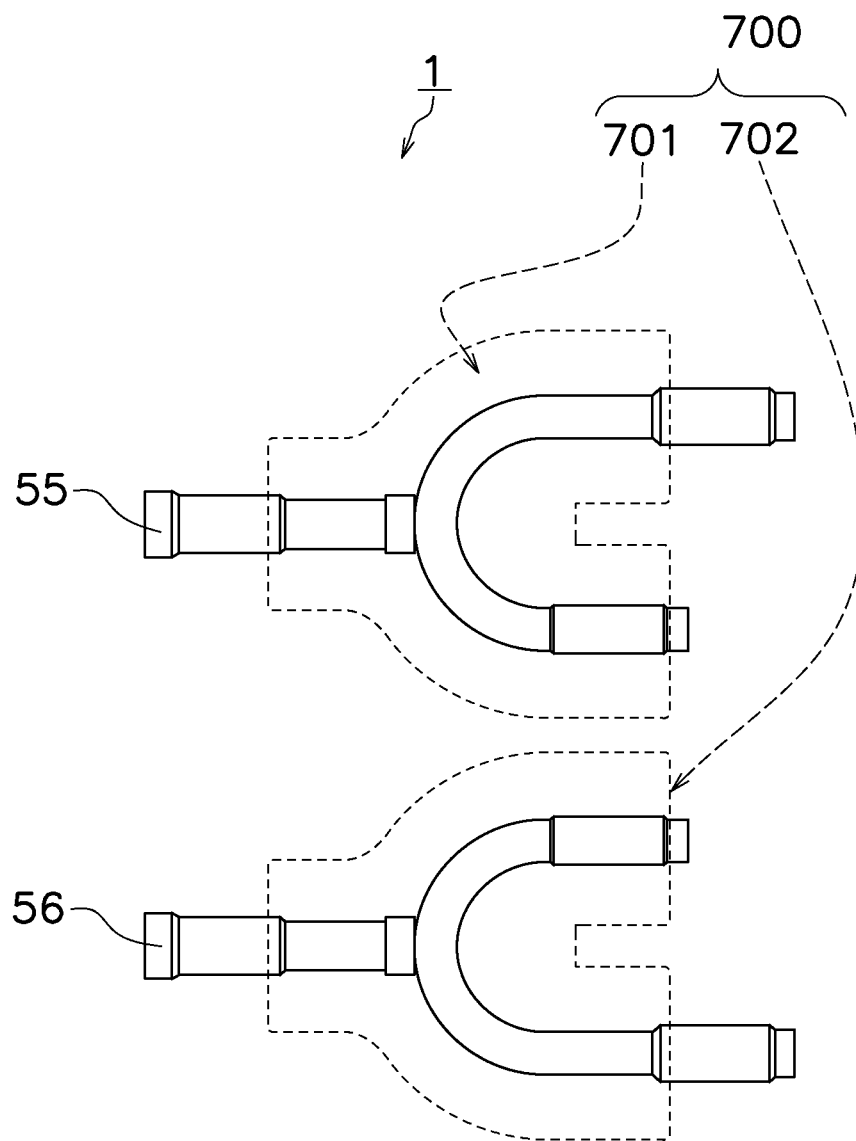
FIG. 20 is a diagram for describing heat-insulating materials according to Modification L.
Figure 21:
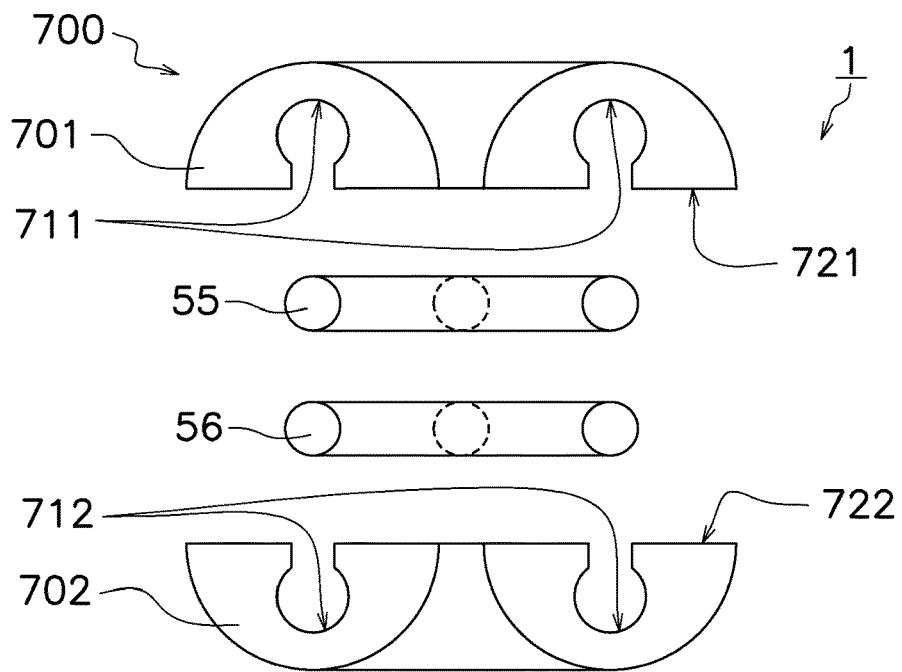
FIG. 21 is a front view showing examples of the heat-insulating materials in FIG. 20.

The air conditioner 1 includes the plurality of heat-insulating materials 701 and 702 or the plurality of heat-insulating materials 703, 704, and 705, each including corresponding ones of the grooves 711, 712, 713, 714, and 715 corresponding to a corresponding one of the second branch pipe 55 and the third branch pipe 56, which are joint portions of the first connection pipe 51 and the second connection pipe 52 shown from FIG. 20 to FIG. 22. The plurality of heat-insulating materials 701 and 702 or the plurality of heat-insulating materials 703 to 705 cover a corresponding one or ones of the second branch pipe 55 and the third branch pipe 56. In this way, since it is possible to save time and effort to form the grooves 711 to 716 in a corresponding one of the heat-insulating materials 701 to 706 due to the grooves 711 to 716 of the corresponding one of the heat-insulating materials 701 and 702 or the corresponding one of the heat-insulating materials 703 to 705, it is possible to reduce the number of man hours for a heat-insulation operation using the heat-insulating materials 701 to 706.

(8-17)

When the heat-insulating materials 601, 602, and 603 shown in FIGS. 18 and 19 or the heat-insulating materials 701, 702, 703, 704, and 705 shown from FIG. 20 to FIG. 22 are resin heat-insulating materials that are stretchable and contractible, the lengths of the heat-insulating materials 601 to 603, the heat-insulating materials 701 and 702, and the heat-insulating materials 703 to 705 are easily made to correspond with the lengths of the first connection pipe 51 and the second connection pipe 52, and a heat-insulation operation can be facilitated.

(8-18)

The first connection flow path 50 shown in each of FIGS. 15A, 15B, 16A, and 16B includes a corresponding one of the special-purpose coils 300 and 350 and the special-purpose straight pipes 400 and 450 in which at least one end of the first connection pipe 51 and one end of the second connection pipe 52 merge and are integrated with each other. In this way, when the special-purpose coils 300 and 350 or the special-purpose straight pipes 400 and 450 merge at least one end of the first connection pipe 51 and one end of the second connection pipe 52 and integrate them with each other, it is possible to reduce the number of brazing portions required for installing the air conditioner 1.

(8-19)

The first connection flow path 50 shown in FIG. 17 includes the special-purpose socket 500 that makes it possible to braze the first connection pipe 51 and the second connection pipe 52 all at once. In such a structure, by brazing the first connection pipe 51 and the second connection pipe 52 all at once by the special-purpose socket 500, it is possible to reduce the number of brazing portions required for installing the air conditioner 1 compared with when the first connection pipe 51 and the second connection pipe 52 are individually brazed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGN LIST

- 1 air conditioner (example of refrigeration cycle device)
- 10 heat source unit
- 10*a*, 31*a* first connection part
- 10*b*, 31*b* second connection part
- 10*c* heat-source-unit casing
- 10*m*, 10*n*, 31*m*, 31*n* connection end
- 11 compressor
- 12 heat-source-side heat exchanger
- 31 first use unit
- 31*c* first-use-unit casing
- 32 second use unit
- 41 first use-side heat exchanger
- 42 second use-side heat exchanger
- 44 first on-off valve (example of first valve)
- 45 second on-off valve (example of second valve)
- 50 first connection flow path
- 51 first connection pipe
- 51*a*, 51*b* first connection end
- 52 second connection pipe
- 52*a*, 52*b* second connection end
- 54 single pipe
- 80 second connection flow path
- 81 metallic pipe
- 200 branch socket
- 300, 350 special-purpose coil
- 400, 450 special-purpose pipe
- 500 special-purpose socket
- 601 to 603, 701 to 702, 703 to 705 heat-insulating material
- 611 to 616, 711 to 712, 713 to 716 groove

CITATION LIST

Patent Literature

PTL 1: Japanese Unexamined Patent Application Publication No. 2002-107011

The invention claimed is:

1. A refrigeration cycle device comprising:
a heat source unit that has a compressor and a heat-source-side heat exchanger;
a first use unit that is separated from the heat source unit and that has a first use-side heat exchanger;
a second use unit that is separated from the heat source unit and that has a second use-side heat exchanger;
a first connection flow path that connects the heat source unit to the first and the second use units and causes a first refrigerant to flow; and
a second connection flow path that connects the heat source unit to the first and the second use units and causes a second refrigerant to flow, wherein
a specific enthalpy of the second refrigerant is smaller than a specific enthalpy of the first refrigerant,
the heat source unit, the first use unit, the second use unit, the first connection flow path, and the second connection flow path constitute a refrigerant circuit that includes the compressor, the heat-source-side heat exchanger, and the first and the second use-side heat exchangers,
the refrigerant circuit repeats a vapor compression refrigeration cycle,
the refrigerant circuit uses a refrigerant that has a saturation pressure that is 4.5 MPa or higher when a saturation temperature reaches 65° C., or a refrigerant that has a critical temperature that is 65° C. or lower; and
the first connection flow path comprises a metallic first connection pipe and a metallic second connection pipe, and causes a refrigerant to flow from one of the heat source unit and the first use unit to both of the first connection pipe and the second connection pipe, and causes refrigerants, that each flow in a corresponding one of the first connection pipe and the second connection pipe, to each flow from the corresponding one of the first connection pipe and the second connection pipe to the other of the heat source unit and the first use unit,
the first connection flow path causes a refrigerant to flow from one of the heat source unit and the second use unit to both of the first connection pipe and the second connection pipe, and causes refrigerants, that each flow in a corresponding one of the first connection pipe and the second connection pipe, to each flow from the corresponding one of the first connection pipe and the second connection pipe to the other of the heat source unit and the second use unit,
the first connection pipe and the second connection pipe are main pipe parts that are common to the first use unit and the second use unit,
the first use unit has a first valve that opens and closes the first connection pipe and a second valve that opens and closes the second connection pipe,
when the first use unit is stopped from a state in which the first use-side heat exchanger has been made to function as a heat dissipater, the first valve and the second valve are closed, and
an outside diameter of the first connection pipe and an outside diameter of the second connection pipe differ from each other.

2. The refrigeration cycle device according to claim 1, wherein the first connection flow path further comprises a third connection pipe, and is configured such that a refrigerant, that flows in one of the heat-source-side heat exchanger and the first use-side heat exchanger, flows in each of the first connection pipe, the second connection pipe, and the third connection pipe, and causes all refrigerants, that have each flowed in a corresponding one of the first connection pipe, the second connection pipe, and the third connection pipe, to flow to the other of the heat-source-side heat exchanger and the first use-side heat exchanger.

3. The refrigeration cycle device according to claim 1, wherein the first connection flow path is configured such that, in a predetermined operating mode, a refrigerant flows in the first connection pipe and a refrigerant does not flow in the second connection pipe.

4. The refrigeration cycle device according to claim 1, wherein at least one of the heat source unit and the first use unit has a first connection part and a second connection part that are connected to the first connection pipe and the second connection pipe.

5. The refrigeration cycle device according to claim 4, wherein
the heat source unit has a heat-source-unit casing that accommodates the compressor and the heat-source-side heat exchanger,
the first use unit has a first-use-unit casing that accommodates the first use-side heat exchanger, and
the first connection part and the second connection part are disposed in at least one of the heat-source-unit casing and the first-use-unit casing.

6. The refrigeration cycle device according to claim 4, wherein a connection end of the first connection part and a connection end of the second connection part are offset from each other by at least a prescribed value in at least one of a pipe diameter direction and a pipe axis direction of the first connection part.

7. The refrigeration cycle device according to claim 1, wherein
the first connection pipe has a first connection end into which a refrigerant flows from one of the heat source unit and the first use unit,
the second connection pipe has a second connection end into which a refrigerant flows from one of the heat source unit and the first use unit, and
the first connection end and the second connection end are offset from each other by at least a prescribed value in at least one of a pipe diameter direction and a pipe axis direction of the first connection pipe.

8. The refrigeration cycle device according to claim 7, further comprising:
a branch socket that allows the first connection end and the second connection end to be offset from each other by at least the prescribed value in the at least one of the pipe diameter direction and the pipe axis direction of the first connection pipe.

9. The refrigeration cycle device according to claim 1, further comprising:
a plurality of heat-insulating materials having a plurality of grooves corresponding to the first connection pipe, the second connection pipe, and the second connection flow path, or having a groove corresponding to a joint portion of the first connection pipe and the second connection pipe,
wherein the plurality of heat-insulating materials cover peripheries of the first connection pipe, the second connection pipe, and the second connection flow path, or a periphery of the joint portion.

10. The refrigeration cycle device according to claim 9, wherein a material of the plurality of heat-insulating materials is hard resin or semi-hard resin.

11. The refrigeration cycle device according to claim 1, further comprising:
a resin heat-insulating material, that covers the first connection pipe and the second connection pipe, that is stretchable and contractible.

12. The refrigeration cycle device according to claim 1, wherein the first connection flow path includes a special-purpose coil or a special-purpose straight pipe in which at least one end of the first connection pipe and one end of the second connection pipe merge and are integrated with each other.

13. The refrigeration cycle device according to claim 1, wherein
the first connection flow path has a first insertion port and a second insertion port into which the first connecting pipe and the second connecting pipe are inserted, the first insertion port and the second insertion port are connected as one opening, and
the first connection flow path includes a special-purpose socket that allows the first connection pipe and the second connection pipe to be brazed all at once.

14. A refrigeration cycle device comprising:
a heat source unit that has a compressor and a heat-source-side heat exchanger;
a first use unit that is separated from the heat source unit and that has a first use-side heat exchanger;
a first connection flow path that connects the heat source unit to the first use unit and causes a first refrigerant to flow; and
a second connection flow path that connects the heat source unit to the first use unit and causes a second refrigerant to flow, wherein
a specific enthalpy of the second refrigerant is smaller than a specific enthalpy of the first refrigerant,
the heat source unit, the first use unit, the first connection flow path, and the second connection flow path constitute a refrigerant circuit that includes the compressor, the heat-source-side heat exchanger, and the first use-side heat exchanger,
the refrigerant circuit repeats a vapor compression refrigeration cycle,
the refrigerant circuit uses a refrigerant that has a saturation pressure that is 4.5 MPa or higher when a saturation temperature reaches 65° C., or a refrigerant that has a critical temperature that is 65° C. or lower; and
the first connection flow path comprises a metallic first connection pipe and a metallic second connection pipe, and causes a refrigerant to flow from one of the heat source unit and the first use unit to both of the first connection pipe and the second connection pipe, and causes refrigerants, that each flow in a corresponding one of the first connection pipe and the second connection pipe, to each flow from the corresponding one of the first connection pipe and the second connection pipe to the other of the heat source unit and the first use unit,
the second connection flow path comprises a metallic pipe that causes a refrigerant, that has a specific enthalpy that is smaller than a specific enthalpy of the first connection flow path, to flow, and
at least one of the first connection pipe and the second connection pipe has an outside diameter that is substantially the same as an outside diameter of the metallic pipe of the second connection flow path and has a covering color that differs from a covering color of the metallic pipe of the second connection flow path.

15. A refrigeration cycle device comprising:
a heat source unit that has a compressor and a heat-source-side heat exchanger;
a first use unit that is separated from the heat source unit and that has a first use-side heat exchanger;
a second use unit that is separated from the heat source unit and that has a second use-side heat exchanger;
a first connection flow path that connects the heat source unit to the first and the second use units and causes a first refrigerant to flow; and
a second connection flow path that connects the heat source unit to the first and the second use units and causes a second refrigerant to flow, wherein
a specific enthalpy of the second refrigerant is smaller than a specific enthalpy of the first refrigerant,
the heat source unit, the first use unit, the second use unit, the first connection flow path, and the second connection flow path constitute a refrigerant circuit that includes the compressor, the heat-source-side heat exchanger, and the first and the second use-side heat exchangers, the refrigerant circuit repeats a vapor compression refrigeration cycle, the refrigerant circuit uses a refrigerant that has a saturation pressure that is 4.5 MPa or higher when a saturation temperature reaches 65° C., or a refrigerant that has a critical temperature that is 65° C. or lower, the first connection flow path comprises a metallic first connection pipe and a metallic second connection pipe, and causes a refrigerant to flow from one of the heat source unit and the first use unit to both of the first connection pipe and the second connection pipe, and causes refrigerants, that each flow in a corresponding one of the first connection pipe and the second connection pipe, to each flow from the corresponding one of the first connection pipe and the second connection pipe to the other of the heat source unit and the first use unit, the first connection flow path causes a refrigerant to flow from one of the heat source unit and the second use unit to both of the first connection pipe and the second connection pipe, and causes refrigerants, that each flow in a corresponding one of the first connection pipe and the second connection pipe, to each flow from the corresponding one of the first connection pipe and the second connection pipe to the other of the heat source unit and the second use unit, the first connection pipe and the second connection pipe are main pipe parts that are common to the first use unit and the second use unit, the first use unit has a first valve that opens and closes the first connection pipe and a second valve that opens and closes the second connection pipe, when the first use unit is stopped from a state in which the first use-side heat exchanger has been made to function as a heat dissipater, the first valve and the second valve are closed, and the first connection flow path is configured such that a single pipe is connected to a collecting pipe comprising two or more pipes including the first connection pipe and the second connection pipe, and a flow path cross-sectional area of the collecting pipe is greater than or equal to 90% of a flow path cross-sectional area of the single pipe.

\* \* \* \* \*